US010663957B2

(12) United States Patent
Clark et al.

(10) Patent No.: US 10,663,957 B2
(45) Date of Patent: May 26, 2020

(54) METHODS AND SYSTEMS FOR PROCESS AUTOMATION CONTROL

(71) Applicant: Schneider Electric Systems USA, Inc., Foxboro, MA (US)

(72) Inventors: Donald C. Clark, Amesbury, MA (US); Richard Linwood Linscott, Plainville, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 163 days.

(21) Appl. No.: 15/716,762

(22) Filed: Sep. 27, 2017

(65) Prior Publication Data

US 2019/0056720 A1 Feb. 21, 2019

Related U.S. Application Data

(60) Provisional application No. 62/548,115, filed on Aug. 21, 2017.

(51) Int. Cl.
| | |
|---|---|
| G05B 19/418 | (2006.01) |
| H04L 29/08 | (2006.01) |
| H04L 29/06 | (2006.01) |
| H04W 4/80 | (2018.01) |
| H04W 12/00 | (2009.01) |
| H04L 12/24 | (2006.01) |
| G06F 11/30 | (2006.01) |

(52) U.S. Cl.
CPC ....... G05B 19/4185 (2013.01); G05B 19/418 (2013.01); H04L 63/0428 (2013.01); H04L 67/125 (2013.01); H04W 4/80 (2018.02); H04W 12/001 (2019.01); G05B 2219/31115 (2013.01); G05B 2219/40458 (2013.01); G06F 11/30 (2013.01); H04L 41/08 (2013.01)

(58) Field of Classification Search
CPC ........ G06F 11/30; H04L 41/08; H04L 67/125; G05B 19/418; G05B 19/4185
See application file for complete search history.

(56) References Cited

U.S. PATENT DOCUMENTS

| | | | | |
|---|---|---|---|---|
| 2003/0033400 | A1* | 2/2003 | Pawar | G06F 11/302 709/223 |
| 2013/0086700 | A1* | 4/2013 | Cho | H04L 67/303 726/36 |
| 2014/0005809 | A1* | 1/2014 | Frei | G08B 25/01 700/90 |
| 2016/0112870 | A1* | 4/2016 | Pathuri | H04L 63/104 726/4 |
| 2017/0066348 | A1 | 3/2017 | Nagura et al. | |
| 2017/0066350 | A1 | 3/2017 | Dry | |
| 2017/0315795 | A1* | 11/2017 | Keller | G06F 9/45558 |
| 2018/0367612 | A1* | 12/2018 | Fallon | H04L 41/046 |

* cited by examiner

Primary Examiner — Jeong S Park
(74) Attorney, Agent, or Firm — Locke Lord LLP

(57) ABSTRACT

Systems and methods are described for control and/or asset performance management of a system, in-situ, at an asset. A system application model can be deployed to at least a first network node fixed, in-situ, at the asset using a short-range, low-power communication network. The first network node can execute a master avatar using the deployed system application model and generate, at a second network node, a master-slave avatar using the master avatar executed at the first network node. The master avatar and/or master-slave avatar can be configured to perform control of the system, in-situ, at the first network node and the second network node.

16 Claims, 13 Drawing Sheets

METHODS AND SYSTEMS FOR PROCESS AUTOMATION CONTROL

TECHNICAL FIELD

The present disclosure is generally directed to process automation control. More particularly, aspects of the present disclosure relate to methods and systems for autonomous and/or semi-autonomous control of assets in a process control industry, for example, an industrial plant.

INTRODUCTION

Early control systems were designed to provide process control functions for a control loop and/or multiple related control loops of a production process in an autonomous, but coordinated manner, with coordination often being achieved through set points across multiple controllers. Consequently, the architecture of early control systems was aligned to the process flow of the production process and each process control function was configured to control only a small component (or aspect) of the overall production flow of operation (i.e., the automation platform was the delivery vehicle for a predefined control solution). Recently, due, in part, to a shift from control engineering to networks, task-oriented operating systems have moved to the forefront of process automation control. These operating systems, which include computer modules focused on running higher level applications, as well as other functional modules configured to perform human machine interfacing, networking, and other critical functions, enable autonomous control for process control loops.

SUMMARY

The present disclosure solves one or more of the above-mentioned problems and/or demonstrates one or more of the above-mentioned desirable features. Other features and/or advantages may become apparent from the description that follows.

In accordance with at least one exemplary embodiment, the present disclosure contemplates a system for performing control, in-situ, at an asset and at least a first network node embedded and networked, in-situ, at the asset. The first network node can be configured to decrypt an encoded relationship mapping, the encoded relationship mapping being deployed at the first network node using a short-range, low-power communication protocol. Using the decrypted relationship mapping, the first network node can page at least a second network node. On receipt of a signal from the second network node, the first network node can deploy a select portion of the decrypted relationship mapping to the second network node.

In accordance with another exemplary embodiment, the present disclosure contemplates a system for asset performance management, in-situ, at an asset that includes a plurality of logically coupled asset control modules. At least one of the plurality of asset control modules can be configured to access an application model stored at a central datastore. The application model can include a relationship mapping for the plurality of asset control modules. Using the relationship mapping, the at least one asset control module can configure a communication fog that includes the plurality of asset control modules. A control strategy can be executed at the asset via the at least one asset control module using the configured communication fog.

In accordance with at least one exemplary embodiment, the present disclosure contemplates a method for performing control of a system, in-situ, at an asset. The method includes deploying a system application model to at least a first network node fixed, in-situ, at the asset using a short-range, low-power communication network. At the first network node, a master avatar can be executed using the deployed system application model. The master avatar, executed at the first network node, can generate a master-slave avatar at a second network node. Control of the system can be performed, in-situ, at the first network node and the second network node using the generated master avatar and/or master-slave avatar.

Additional objects and advantages will be set forth in part in the description which follows, and in part will be obvious from the description, or may be learned by practice of the present disclosure and/or claims. At least some of these objects and advantages may be realized and attained by the elements and combinations particularly pointed out in the appended claims.

It is to be understood that both the foregoing general description and the following detailed description are exemplary and explanatory only and are not restrictive of the invention, as disclosed or claimed. The claims should be entitled to their full breadth of scope, including equivalents.

BRIEF DESCRIPTION OF THE DRAWINGS

The present disclosure can be understood from the following detailed description either alone or together with the accompanying drawings. The drawings are included to provide a further understanding of the present disclosure, and are incorporated in and constitute a part of this specification. The drawings, which are incorporated in and constitute a part of this specification, illustrate one or more embodiments of the present disclosure and, together with the description, explain certain principles and operation. In the drawings.

DETAILED DESCRIPTION

This description and the accompanying drawings illustrate exemplary embodiments and should not be taken as limiting, with the claims defining the scope of the present disclosure, including equivalents. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

It is noted that, as used in the specification and the appended claims, the singular forms "a," "an," and "the," and any singular use of any word, include plural referents unless expressly and unequivocally limited to one referent. As used herein, the term "include" and its grammatical variants are intended to be non-limiting, such that recitations of items in a list is not to the exclusion of other like items that can be substituted or added to the listed items.

Figure 1A:
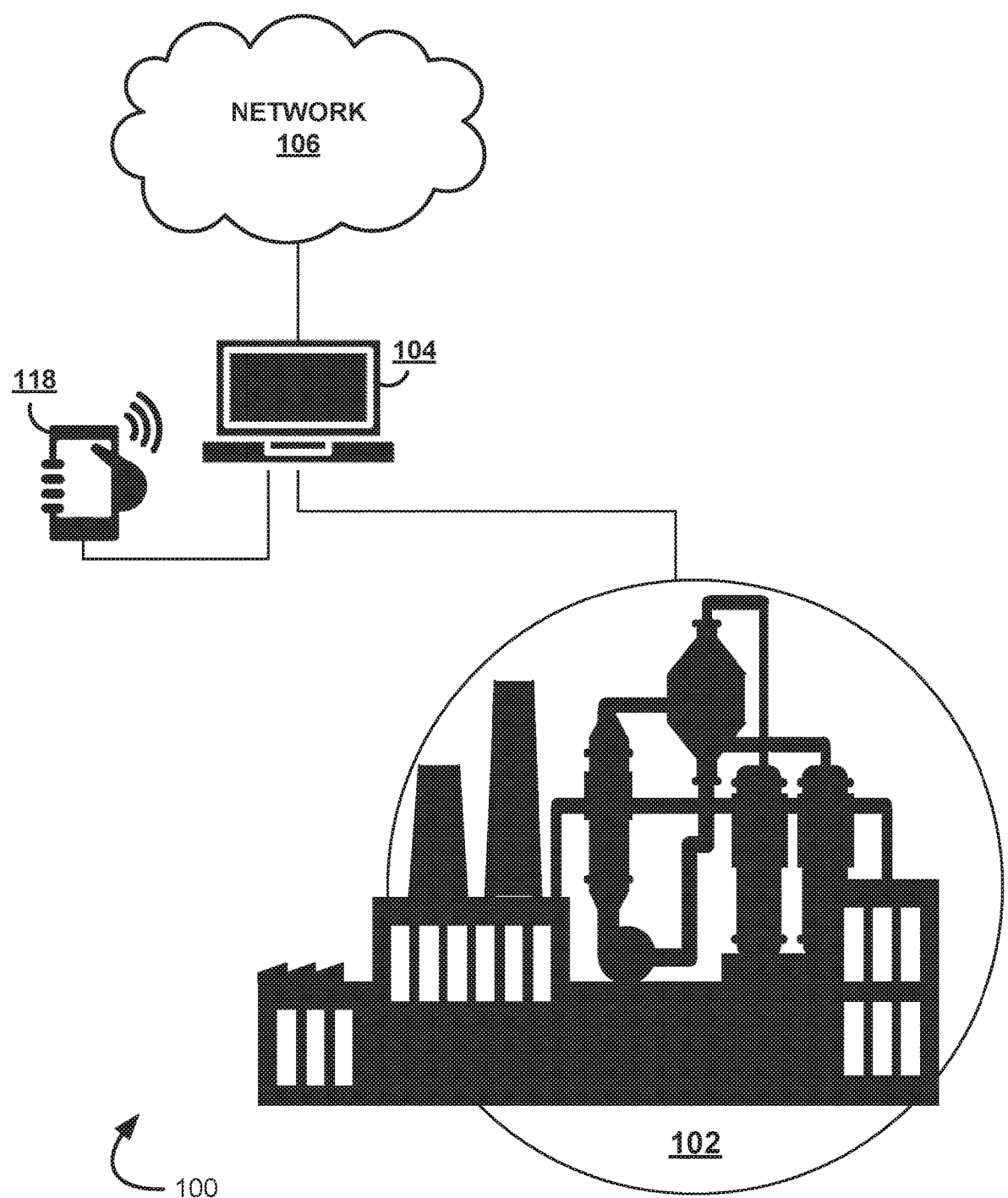
FIG. 1A is a schematic view of an exemplary process control system configured to enable asset performance management in accordance with an exemplary embodiment of the present disclosure.
Figure 1B:
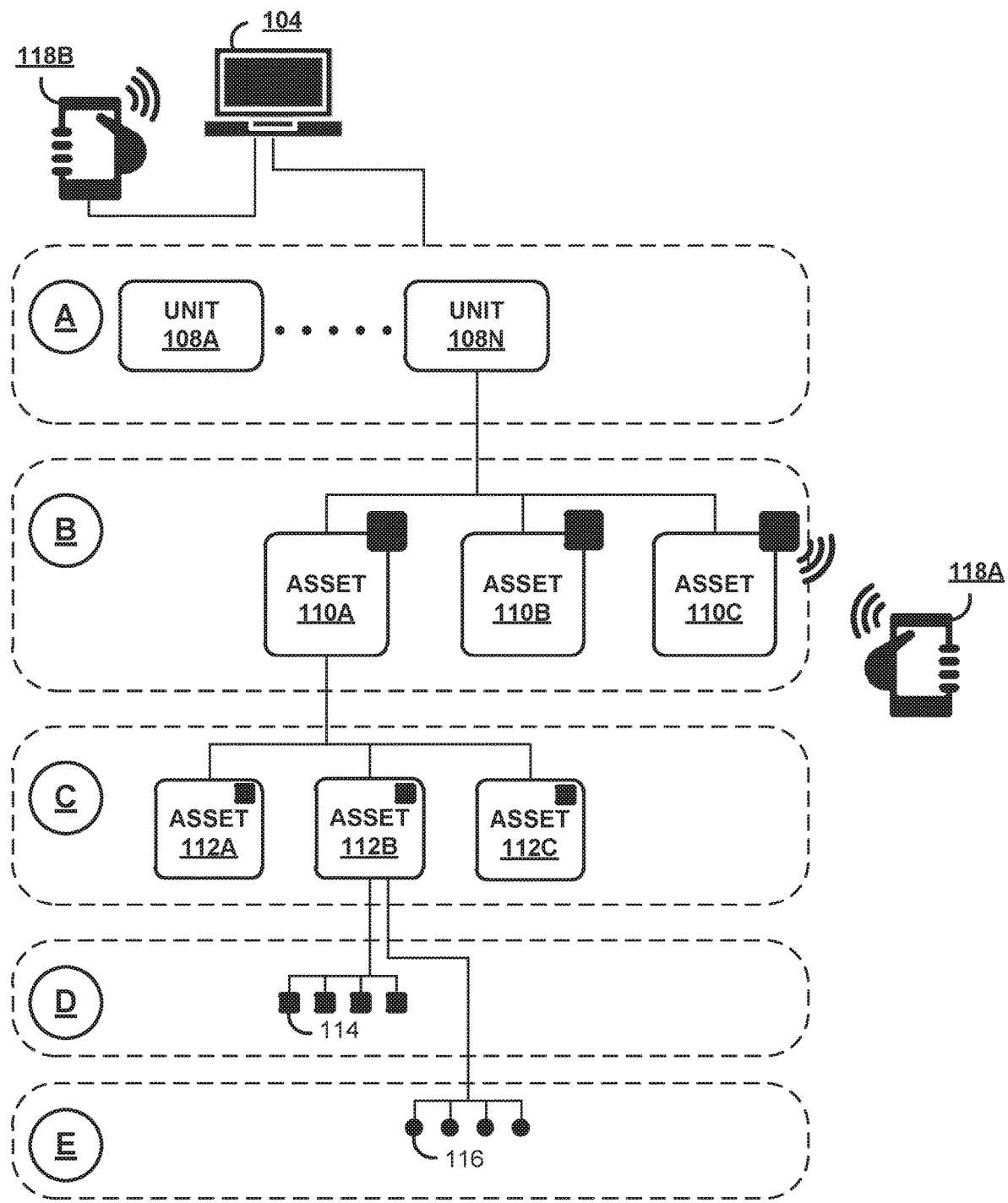
FIG. 1B is a schematic diagram that shows a portion of the exemplary process control system of FIG. 1A with network nodes configured in hierarchical layers in accordance with an exemplary embodiment of the present disclosure.

With reference now to FIGS. 1A and 1B, a schematic view of an exemplary process control system 100 is depicted. System 100 includes wireless devices 118, 118A, 118B (e.g., a remote terminal unit, cell phone, smart phone, computing platform, and/or Internet access device that includes a wireless interface for sending and/or receiving data over process control system 100, the wireless interface including transmitters and/or receivers associated with, for example, CDMA, GSM, WiMAX, LTE, and/or HSDPA, IEEE 802.11, Wi-Fi, Bluetooth, Zigbee, IrDA, MBMS, etc.), which can use a local area network (LAN), wide area network (WAN), or internetwork (including the Internet) to communicate over network 106. System 100 further includes environment 102 (e.g., including units 108A-108N, assets 110A-110C, 112A-112C, asset control modules 114, and/or asset indicators 116), network node 104, and/or network 106.

Network 106 can be a wired and/or wireless communication network that uses for example, physical and/or wireless data links to carry network data among (or between), for example, environment 102 (e.g., including units 108A-108N, assets 110A-110C, 112A-112C, asset control modules 114, and/or asset indicators 116), wireless devices 118, 118A, 118B, and/or network node 104. Network 106 can support push-to-talk (PTT), broadcast video, and/or network data communications by environment 102, wireless devices 118, 118A, 118B, and/or network node 104. Network protocols can include, for example, MBMS, CDMA, 1×RTT, GSM, UMTS, HSPA, EV-DO, EV-DO rev, A, 3GPP LTE, WiMAX, etc. Wired network protocols can include, for example, Ethernet, Fast Ethernet, Gigabit Ethernet, Local Talk (such as Carrier Sense Multiple Access with collision Avoidance), Token Ring, FDD, ATM, etc.

Network node 104 can be a standalone computing device, computing system, network component, or other access node that uses, for example, physical and/or wireless data links to carry network data among (or between), for example, environment 102 (e.g., including units 108A-108N, assets 110A-110C, 112A-112C, asset control modules 114, and/or asset indicators 116), wireless devices 118, 118A, 118B, and/or network 106. Network node 104 can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc. Other network elements can be used to facilitate communication between, for example, network node 104 and network 106, which are omitted for clarity, including additional processing nodes, routers, gateways, and physical and/or wireless data links for carrying data among the various network elements.

As noted above, system 100 (e.g., including network 106, network node 104, and/or wireless devices 118, 118A, 118B) can be used to enable process control of environment 102. In one exemplary embodiment, environment 102 can be configured as an industrial control environment. As shown in FIG. 1B, the industrial control environment 102 includes (or can be broken down into) different units 108A-108N that include individual and/or groups of self-configuring and/or self-identifying assets 110A-110C, 112A-112C (e.g., heat exchangers, distillation columns, reactors, pumps, valves, etc.), asset control modules 114, and/or asset indicators 116 configured in hierarchical layers (A)-(E) at the units 108A-108N based on, for example, a criterion (e.g., profile, classification, type, role, location, etc.) of the assets 110A-110C, 112A-112C, asset control modules 114, and/or asset indicators 116. Asset indicators 116 and/or asset control modules 114 can be configured at lower hierarchical layers (D), (E) compared to assets 110A-110C, 112A-112C and/or units 108A-108N. Further, asset indicators 116 and/or asset control modules 114 can be embedded in and networked at assets 110A-110C, 112A-112C such that the assets 110A-110C, 112A-112C, in conjunction with asset indicators 116 and/or asset control modules 114, operate as autonomous or semi-autonomous control systems configured to control and/or optimize process control of, for example, industrial control environment 102, in-situ, at the asset 110A-110C, 112A-112C. Examples of such control and/or optimization are discussed in International Application No.: PCT/US2016/056681, entitled "Systems and Methods of Hierarchical Smart Asset Control Application Development and Optimization," filed on Oct. 12, 2016, and International Application No.: PCT/US2016/056679, entitled "Systems and Methods of Hierarchical Smart Asset Control Application Development and Optimization," filed on Oct. 12, 2016, the entire contents of each of which is incorporated herein by reference. In one exemplary embodiment, the asset indicators 116 and/or asset control modules 114 can be manually preprogrammed and/or keyed at the assets 110A-110C, 112A-112C such that, on embedding and networking at the assets 110A-110C, 112A-112C, the asset indicators 116 and/or asset control modules 114 can self-configure.

Figure 1C:
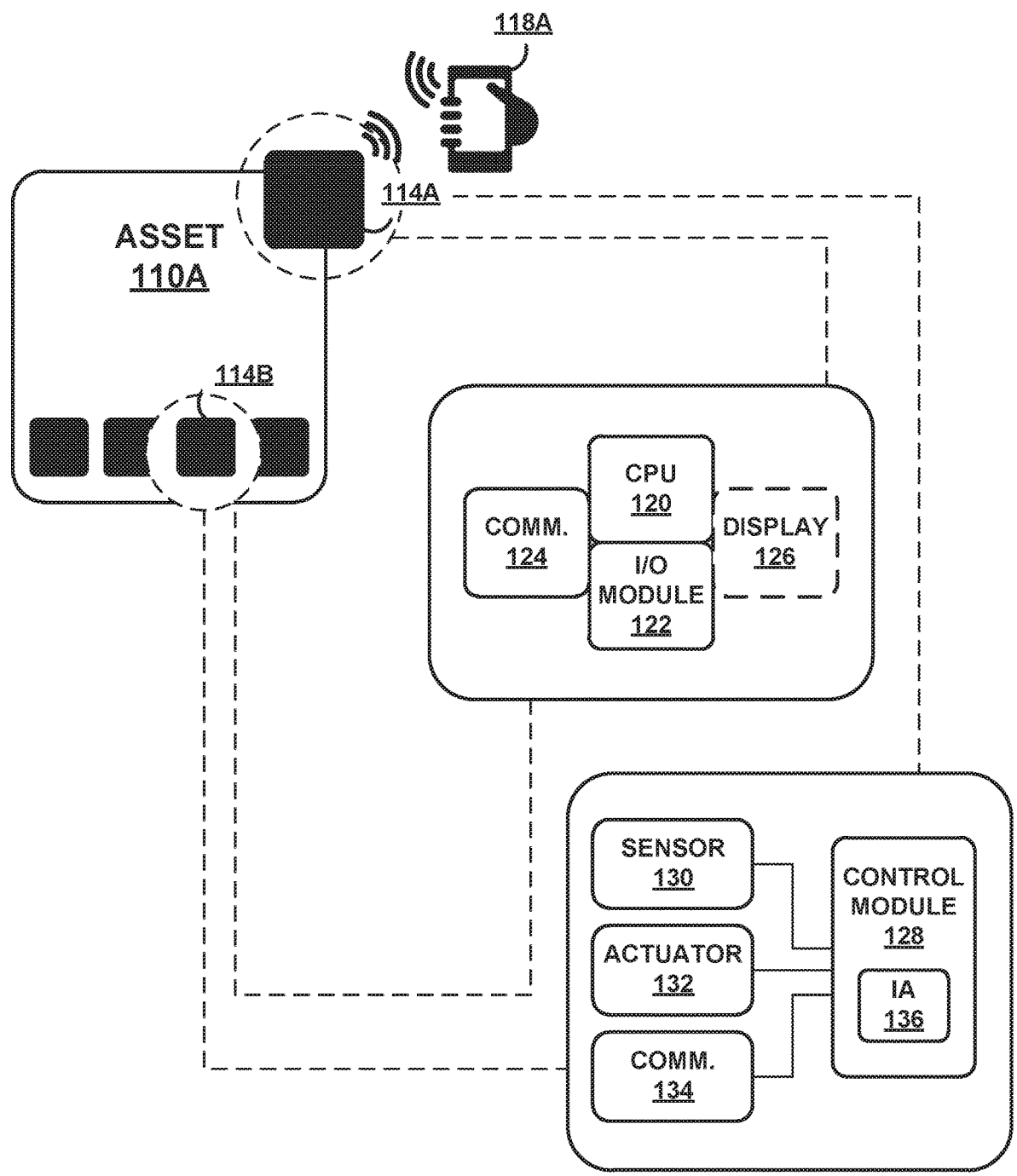
FIG. 1C is another schematic diagram that shows a network node of the exemplary process control system of FIGS. 1A and 1B in accordance with an exemplary embodiment of the present disclosure.
Figure 1D:
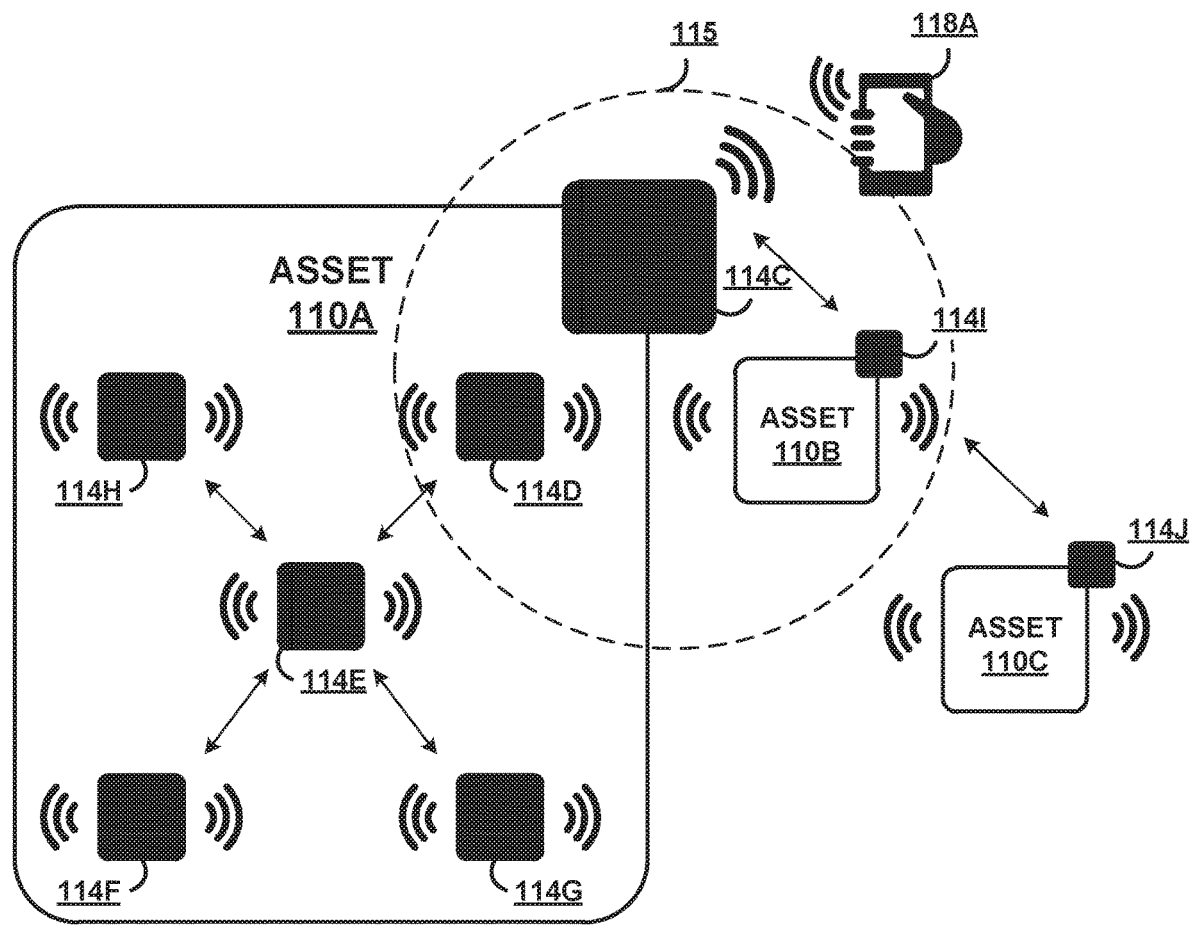
FIG. 1D is another schematic diagram that shows network nodes of the exemplary process control system of FIGS. 1A-1C configured to enable process control, in-situ, at the network nodes in accordance with an exemplary embodiment of the present disclosure.

With reference now to FIGS. 1B-1D, asset indicators 116 and/or asset control modules 114, 114A-114J can include hardware (e.g., a Central Processing Unit (CPU) 120 and/or other control module 128 that includes a processor) capable of executing software code or software modules. In one exemplary embodiment, the software code or software modules of asset control modules 114, 114A-114J can be configured to function as "intelligent agents (IAs)" 136 or "avatars." The IAs 136 or avatars access and/or use asset application data (e.g., asset 110A-110C, 112A-112C, unit 108A-108N, and/or industrial control environment 102 configuration information and/or constraint information) collected at, for example, a centralized datastore (e.g., a redundant, distributed, and/or federated datastore configured at an application and/or CPU or other control module). The centralized datastore can be hosted at and/or distributed among, for example, network 106, network node 104, and/or wireless devices 118, 118A, 118E of process control system 100 or at a cloud-based or external control module configured to communicate with process control system 100. Alternatively, the central datastore can be hosted at and/or distributed among, for example, asset control modules 114, 114A-114J, assets 110A-110C, 112A-112C, and/or units 108A-108N to control and/or optimize process control of industrial control environment 102, in-situ, at the asset 110A-110C, 112A-112C. For example, software code or software modules configured to function as IAs 136 or avatars can implement a control strategy (e.g., a collection of loops configured to perform a particular function at the asset 110A-110C, 112A-112C, asset control modules 114, 114A-114J, and/or asset indicators 116) or algorithm (e.g., a function block) to control aspects (e.g., state commands, phase commands, process control logic, procedures, etc.) of asset control modules 114, 114A-114J, assets 110A-110C, 112A-112C, units 108A 108N, and/or industrial control environment 102. In another embodiment, asset indicators 116 and/or asset control modules 114, 114A-114J can collect asset application data at, for example, CPU 120 and/or control module 128, and, without configuring the software code or software modules to function as IAs 136 or avatars, can control and/or optimize process control of industrial control environment 102, in-situ, at the asset 110A-110C, 112A-112C. In other words, asset indicators 116 and/or asset control modules 114, 114A-114J can maximize process control distribution and/or redundancy at the asset control modules 114, 114A-114J and/or assets 110A-110C, 112A-112C.

Referring to FIG. 1C, asset indicators 116 and/or asset control modules 114, 114A-114J can include different configurations. For example, in one exemplary embodiment, in addition to control module 128, asset indicators 116 and/or asset control modules 114, 114A-114J can include sensors 130, actuators 132, and communication modules 134, among other components. Sensors 130 and/or actuators 132 can be embedded in and networked at assets 110A-110C, 112A-112C. Communication module 134 can facilitate receipt of asset application data at control module 128, which, in-turn, can receive signals from and/or send signals to sensors 130 and/or actuators 132. Communication module 134 can include a network interface that enables flow of asset application data between (or from), for example, asset indicators 116, asset control modules 114, 114A-114J, assets 110A-110C, 112A-112C, units 108A-108N, and/or network node 104 configured in different hierarchical layers (A)-(E) of process control system 100.

In another exemplary embodiment, in addition to CPU 120, asset indicators 116 and/or asset control modules 114, 114A-114J can further include communication module 124, display 126 (optional), and input/output (I/O) module 122, among other components. Communication module 124 can include a network interface that enables flow of asset application data between (or from), for example, asset indicators 116, asset control modules 114, 114A-114J, assets 110A-110C, 112A-112C, units 108A-108N, and/or network node 104 configured in different hierarchical layers (A)-(E) of process control system 100. Display 126 can provide remote and/or local haptic, tactile, and/or visual feedback to an end-user of process control system 100 and/or to other asset indicators 116, asset control modules 114, 114A-114J, assets 110A-110C, 112A-112C, and/or units 108A-108N to alert or indicate a current operational state, status, and/or value of asset indicators 116, asset control modules 114, 114A-114J, assets 110A-110C, 112A-112C, units 108A-108N, and/or network node 104. I/O module 122 can be configured to read input signals and/or communicate output signals to CPU 120 and, in conjunction with CPU 120, can communicate output signals to other asset indicators 116, asset control modules 114, 114A-114J, and/or assets 110A-110C, 112A-112C of units 108A-108N. For example, asset indicators 116 and/or asset control modules 114, 114A-114J can use I/O module 122 to convert input signals measured by asset indicators 116 (e.g., analog signals such as 4-20 mA, discrete signals such as on/off, and/or superimposed digital signals) into other output signals that CPU 120 can decipher, manipulate, combine, and/or relay to, for example, other asset indicators 116, asset control modules 114, 114A-114J, assets 110A-110C, 112A-112C, and/or units 108A-108N of industrial control environment 102.

With reference now to FIGS. 1A-1D, as noted above, individual and/or groups of self-configuring and/or self-identifying asset indicators 116 and/or asset control modules 114, 114A-114J can be embedded in and networked at assets 110A-110C, 112A-112C such that the assets 110A-110C, 112A-112C, in conjunction with the asset indicators 116 and/or asset control modules 114, 114A-114J, operate as autonomous or semi-autonomous control systems configured to control and/or optimize process control of industrial control environment 102, in-situ, at the asset 110A-110C, 112A-112C. The asset indicators 116 and/or asset control modules 114, 114A-114J can be configured to operate in master-slave relationships (e.g., parent-child, client-server, publisher-subscriber, etc.) at assets 110A-110C, 112A-112C deployed in hierarchical layers (A)-(C). In addition, individual and/or groups of asset control modules 114, 114A-114J and/or assets 110A-110C, 112A-112C configured throughout units 108A-108N can be configured in master-slave relationships at units 108A-108N.

Referring to FIG. 1D, in one exemplary embodiment, asset control module 114C can be configured as a master paging asset control module. Master paging asset control module 1140, which can self-configure and/or self-identify, can send and/or receive page commands (e.g., any wired and/or wireless signal capable of being received, recognized, and/or processed by network nodes to which the page command is directed) to/from other self-configuring and/or self-identifying master-slave asset indicators 116, master-slave asset control modules 114, 114A, 114B, 114D-114J, and/or master-slave assets 110A-110C, 112A-112C (e.g., "network nodes") operating in a master-slave relationship configured at units 108A-108N with master paging asset control module 114C. Master paging asset control module 1140, together with master-slave asset indicators 116, master-slave asset control modules 114, 114A, 114B, 114D-114J, master-master-slave assets 110A-110C, 112A-112C, units 108A-108N, and/or network node 104 can form part of a wired and/or wireless mesh network (e.g., a "communication fog"). Each of master-slave asset indicators 116, master-slave asset control modules 114, 114A-114J, master-slave assets 110A-110C, 112A-112C, units 108A-108N, and/or network node 104 can be provided with software instructions (e.g., at a software module and/or other control module that includes a processor) that enable dynamic routing, such that master-slave asset indicators 116, master-slave asset control modules 114, 114A-114J, master-slave assets 110A-110C, 112A-112C, units 108A-108N, and/or network node 104 can automatically select a quickest and/or most efficient path to send page commands across the communication fog from one network node to another. Further, the communication fog can be designed to be self-configuring, self-identifying, self-healing, self-adapting, and/or self-forming, such that newly added, redundant, and/or idle or off state master-slave asset indicators 116, master-slave asset control modules 114, 114A-114J, and/or master-slave assets 110A-110C, 112A-112C "waking-up" can be automatically detected by and added to the communication fog.

Figure 2:
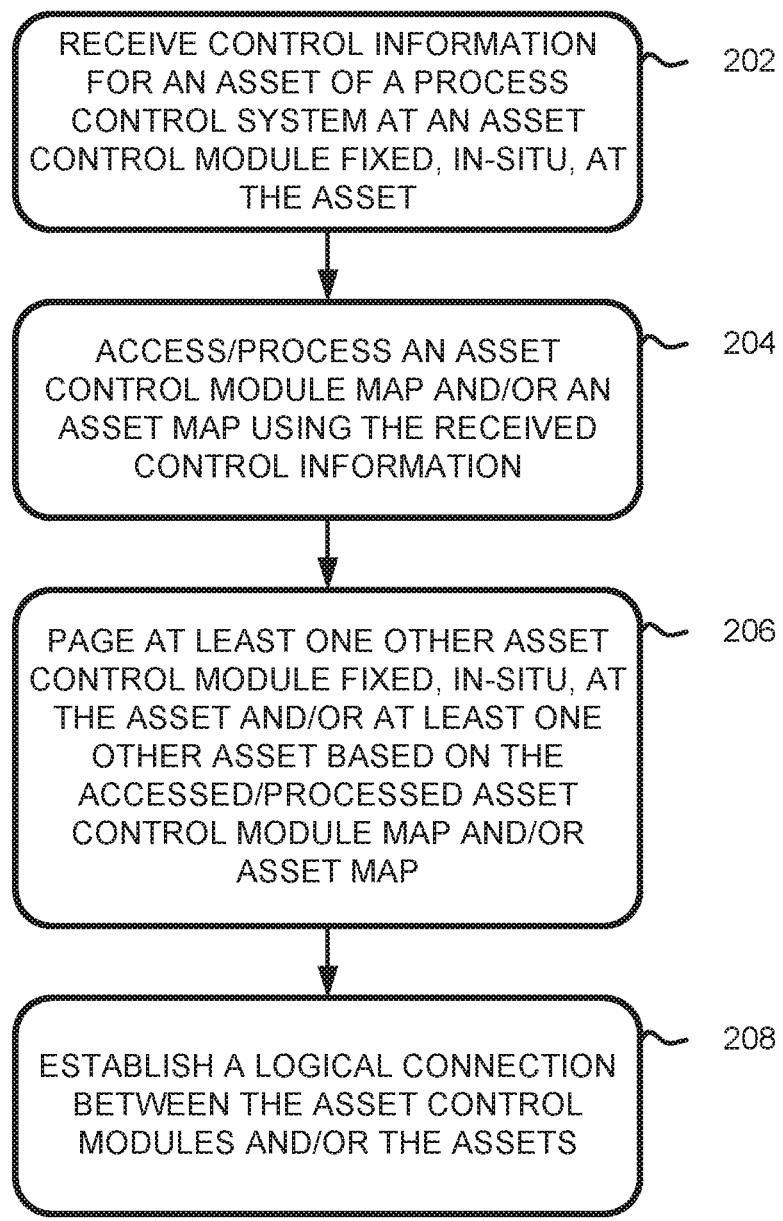
FIG. 2 is a flow diagram depicting a method for enabling process control, in-situ, at a network node in accordance with an exemplary embodiment of the present disclosure.

With reference now to FIG. 2, a flow diagram of an exemplary method for performing process control, in-situ, at a network node is depicted. The method can be implemented in the exemplary process control system 100 shown in FIGS. 1A-1D, or with any suitable control system. The method for performing process control shown in FIG. 2 is discussed with reference to process control system 100 shown in FIGS. 1A-1D. In addition, while FIG. 2 depicts steps performed in a particular order for purposes of illustration, the methods should not be taken as limiting to any particular order or arrangement. One skilled in the art, together with the description, will appreciate that various steps of the methods can be omitted, rearranged, combined, and/or adapted in various ways.

At step 202, control information for a process control system can be received and/or configured at a network node. For example, in one exemplary embodiment, an end-user, using, for example, an application hosted at wireless device 118, 118A, 118B, can deploy control information (e.g., routine control information, optimized control information, process control information, communications control information, asset performance management information, and/or asset application data) at, for example, a self-configuring and/or self-identifying master paging asset control module 114C, using a short-range, low-power communication protocol. The control information can be collected and/or stored at or retrieved from a datastore hosted at asset control modules 114, 114A-114J, assets 110A-110C, 112A-112C, units 108A-108N, wireless devices 118, 118A, 118B, network node 104, and/or network 106 of process control system 100 or at a cloud-based or external control module configured to communicate with process control system 100. Once deployed at master paging asset control module 114C, the master paging asset control module 114C can use select portions of the deployed control information to control self-configuring and/or self-identifying asset indicators 116, asset control modules 114, 114A-114J, and/or assets 110A-110C, 112A-112C configured throughout units 108A-108N and configured in master-slave relationships with master paging asset control module 114C.

For example, in one exemplary embodiment, wireless device 118, 118A, 118B can run a Near-Field Communication (NFC) protocol on an application hosted at the wireless device 118, 118A, 118B. NFC-enabled wireless device 118, 118A, 118B can use magnetic field induction to enable deployment of control information at, for example, NFC-compliant master paging asset control module 114C by moving/bringing the wireless device 118, 118A, 118B in proximity to and/or in contact with master paging asset control module 114C. NFC-enabled wireless device 118, 118A, 118B can also use magnetic field induction to read electronic tags (e.g., passive datastore) configured and/or hosted at NFC-compliant master-slave asset indicators 116, master-slave asset control modules 114, 114A-114J, and/or master-slave assets 110A-110C, 112A-112C. On receipt of the control information, and using software instructions (e.g., that enable dynamic routing of page commands) provided at a software module and/or other control module of master paging asset control module 114D, master paging asset control module 114C can "wake-up" from an idle or off state (e.g., using power harvested from the industrial control environment 102) and send a page command to, for example, nearest neighboring master-slave asset control modules 114, 114I (e.g., master-slave asset control modules 114I, 114J positioned within a signal range 115 of master paging asset control module 114C) and/or to nearest neighboring master-slave assets 110A, 110B (e.g., master-slave assets 110A, 110B positioned within a signal range 115 of master paging asset control module 114C) using a self-configuring, self-identifying, self-healing, self-adapting, and/or self-forming communication fog.

At step 204, a master network node, using the received control information, can access a master-slave relationship mapping. In one exemplary embodiment, using the deployed control information, master paging asset control module 114C can decrypt, decipher, access, and/or process a master-slave relationship mapping configured at, for example, a datastore hosted at and/or distributed among master-slave asset indicators 116, master-slave asset control modules 114, 114A-114J, master-slave assets 110A-110C, 112A-112C, units 108A-108N, wireless devices 118, 118A, 118B, network node 104, and/or network 106 of process control system 100 or a cloud-based or external control module configured to communicate with process control system 100. The master-slave relationship mapping identifies, for example, nearest neighbors, master-slave relationships (e.g., parent-child, client-server, publisher-subscriber, etc.), and/or hierarchical layer criterion (e.g., physical hierarchical relationship, physical location, profile, classification, type, role, etc.) for master-slave asset indicators 116, master-slave asset control modules 114, 114A-114J, master-slave assets 110A-110C, 112A-112C, and/or units 108A-108N configured in, for example, hierarchical layers (A)-(E).

At step 206, a master network node, using the decrypted, deciphered, access, and/or processed master-slave relationship mapping can send a page command to at least one other network node. In one exemplary embodiment, using the master-slave relationship mapping, master paging asset control module 114C can send page commands to, for example, nearest neighboring master-slave asset control modules 114D, 114I and/or nearest neighboring master-slave assets 110A, 110B using the self-configuring, self-identifying, self-healing, self-adapting, and/or self-forming communication fog. In some instances, if the page command is targeted to, for example, master-slave asset control modules 114E-114H, 114J and/or master-slave assets 110O, 112A-112C beyond a signal range 115 of master paging asset control module 114C, the page command sent by master paging asset control module 114C can be initially received at neighboring master-slave asset control modules 114D, 114I and/or neighboring master-slave assets 110A, 110B operating within a signal range 115 of master paging asset control module 114C. The page command can subsequently be sent by neighboring master-slave asset control modules 114D, 114I and/or neighboring master-slave assets 110A, 110B through the communication fog to the targeted master-slave asset control modules 114E-114H, 114J and/or master-slave assets 110C, 112A-112C. In this manner, the communication fog enables master paging asset control module 114C to send page commands to master-slave asset indicators 116, master-slave asset control modules 114, 114A, 114B, 114E-114H, 114J, and/or master-slave assets 110C, 112A-112C disposed beyond the signal range 115 of master paging asset control module 114C.

At step 208, a master network node can establish a logical connection with at least one other network node. In one exemplary embodiment, on receipt of the page command, targeted self-configuring and/or self-identifying master-slave asset indicators 116, master-slave asset control modules 114, 114A-114J, and/or master-slave assets 110A-110C, 112A-112C can "wake-up" from an idle or off state (e.g., using power harvested from industrial control environment 102) and send a preprogrammed position signal to, for example, master paging asset control module 114C through the communication fog. The preprogrammed position signal can include any signal that, when received and processed by master paging asset control module 114C, identifies the precise or approximate location (e.g., position) and/or process application function (e.g., basic process control, asset performance management, etc.) of the targeted master-slave asset indicator 116, master-slave asset control module 114, 114A-114J, and/or master-slave asset 110A-110C, 112A-112C with or without requiring the use of a signal triangulation method and/or other calculation. For example, the preprogrammed position signal can include a preprogrammed text string and/or encoded unique identifier number input into master-slave asset indicator 116, master-slave asset control module 114, 114A-114J, and/or master-slave asset 110A 110C, 112A-112C (e.g., such as through I/O module 122, CPU 120, and/or other control module using a short-range, low-power communication protocol, etc.) during an initial installation of the master-slave asset indicators 116, master-slave asset control modules 114, 114A-114J, and/or master-slave assets 110A-110C, 112A-112C at units 108A-108N of industrial control environment 102 and/or at some other locale. The preprogrammed text string can correspond to a textual phrase relating to, for example, the position and/or process application function of and/or a configured hierarchical layer (A)-(E) of the master-slave asset indicator 116, master-slave asset control module 114, 114A-114J, and/or master-slave asset 110A-110C, 112A-112C. For example, the text string can read: "Location: unit 108N, hierarchical layer B, asset A, control module D, process application function E." In a similar manner, the encoded unique identifier number can generally correspond to a characterization relating to, for example, the position and/or process application function of and/or a configured hierarchical layer (A)-(E) of the master-slave asset indicator 116, master-slave asset control module 114, 114A-114J, and/or master-slave asset 110A-110C, 112A-112C. For example, the encoded unique identifier number can read: "108NB110A114D5," where "108N" indicates unit 108N, "B" indicates hierarchical layer B, "110A" indicates master-slave asset 110A, "114D" indicates master-slave asset control module 114D, and "5" indicates a process application function. Thus, when master paging asset control module 114C sends a page command to, for example, master-slave asset control module 114D, the master-slave asset control module 114D can respond with the preprogrammed text string and/or encoded unique identifier number. Alternatively, regardless of receipt of a page command from, for example, master paging asset control module 114O, self-configuring and/or self-identifying master-slave asset indicators 116, master-slave asset control modules 114, 114A-114J, and/or master-slave assets 110A-110C, 112A-112C can send a preprogrammed position signal to, for example, master paging asset control module 114C using the self-configuring, self-identifying, self-healing, self-adapting, and/or self-forming communication fog.

Master-slave asset indicators 116, master-slave asset control modules 114, 114A-114J, and/or master-slave assets 110A-110C, 112A-112C configured at units 108A-108N can optionally produce any suitable remote and/or local haptic, tactile, and/or visual feedback to alert an end-user and/or other master-slave asset indicator 116, master-slave asset control modules 114, 114A-114J, and/or master-slave assets 110A-110C, 112A-112C of its position, process application function, and/or a current operational state, status, and/or value using, for example, display 126. Further, master paging asset control module 114O can include input buttons (e.g., an alphanumeric keypad), etc., that enables text strings and/or encoded unique identifier numbers of master-slave asset indicator 116, master-slave asset control module 114, 114A-114J, and/or master-slave asset 110A-110C, 112A-112C to be input into the master paging asset control module 114C. An end-user, using the input buttons, can instruct master paging asset control module 114C to send a page command to, for example, targeted master-slave asset control module 114D, which page command is encoded with a text string and/or unique identifier number, such that only the targeted master-slave asset control module 114D can decode the text string and/or unique identifier number and subsequently exchange its position, process application function, and/or current operational state, status, and/or value at, for example, master paging asset control module 114C.

On receipt of a exchanged position, process application function, and/or current operational state, status, and/or value of master-slave asset indicators 116, master-slave asset control modules 114, 114A-114J, and/or master-slave assets 110A-110C, 112A-112C, the master paging asset control module 114C can deploy and/or distribute the control information (or portions thereof) to: a single NFC-compliant master-slave asset control module 114D and/or among multiple NFC-compliant master-slave asset control modules 114, 114A-114J embedded in and networked, in-situ, at a single NFC-compliant asset 110A-110C, 112A-112C and/or among multiple NFC-compliant master-slave asset control modules 114, 114A-114J embedded in and networked, in-situ, at multiple (or different) NFC-compliant assets 110A-110C, 112A-112C.

Although the above is discussed with reference to NFC-enabled wireless devices 118, 118A, 118B and/or NFC-compliant master-slave asset indicators 116, master-slave asset control modules 114, 114A-114J, and/or master-slave assets 110A-110C, 112A-112C, other short-range, low-power communication protocols can be used to facilitate deployment of the control information and/or portions of the control information to compliant master-slave asset indicators 116, master-slave asset control modules 114, 114A-114J, and/or master-slave assets 110A-110C, 112A-112C and/or can be used to enable reading of electronic tags at compliant master-slave asset indicators 116, master-slave asset control modules 114, 114A-114J, and/or master-slave assets 110A-110C, 112A-112C, which are omitted for clarity. In addition, although not shown, network 106 and/or network node 104 can directly deploy (e.g., through a wired and/or wireless connection) control information and/or portions of the control information to master-slave asset indicators 116, master-slave asset control modules 114, 114A-114J, and/or master-slave assets 110A-110C, 112A-112C.

Figure 3A:
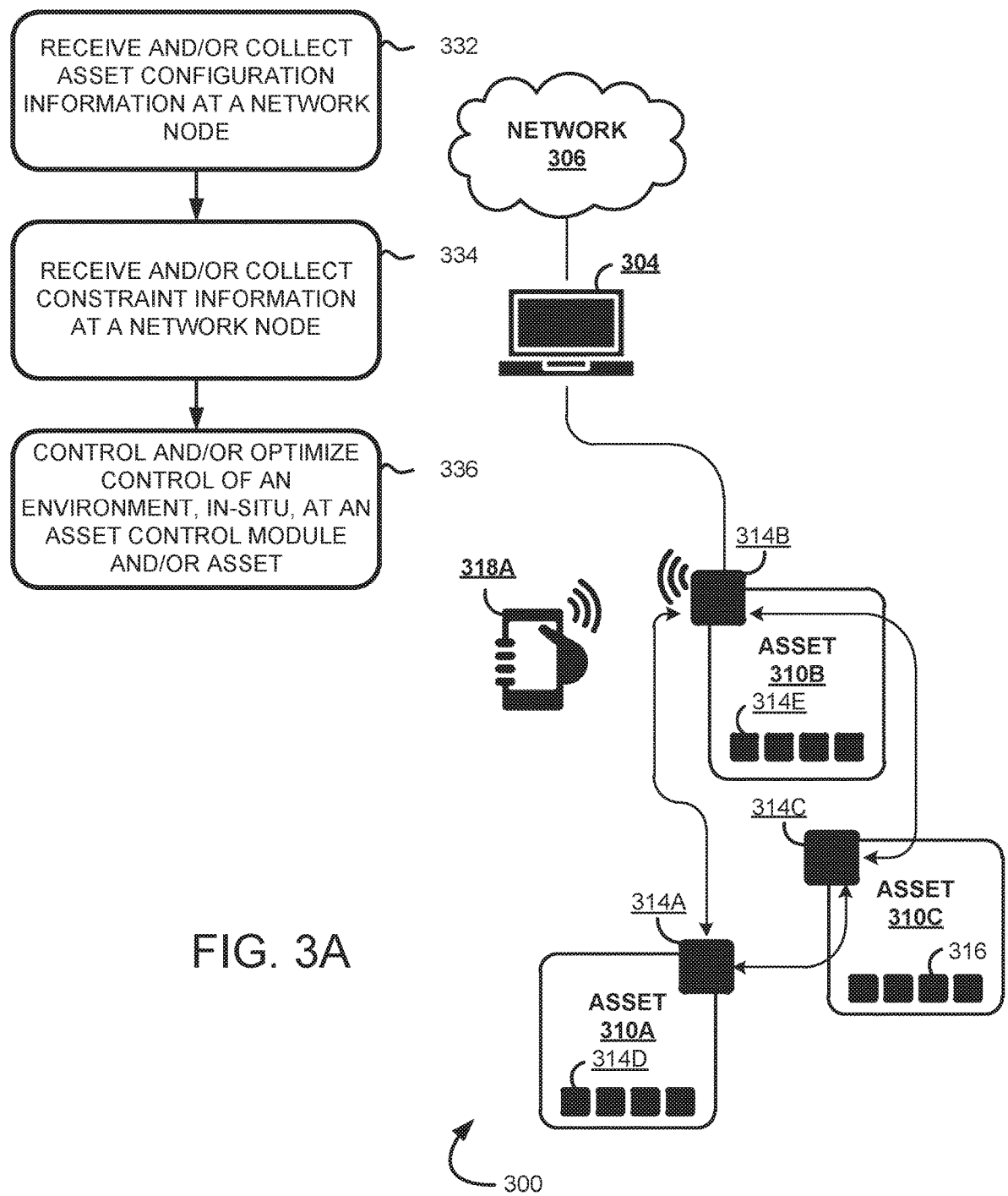
FIGS. 3A and 3B are flow diagrams depicting a method for enabling asset performance management and/or optimization, in-situ, at a network node in accordance with an exemplary embodiment of the present disclosure.
Figure 3B:
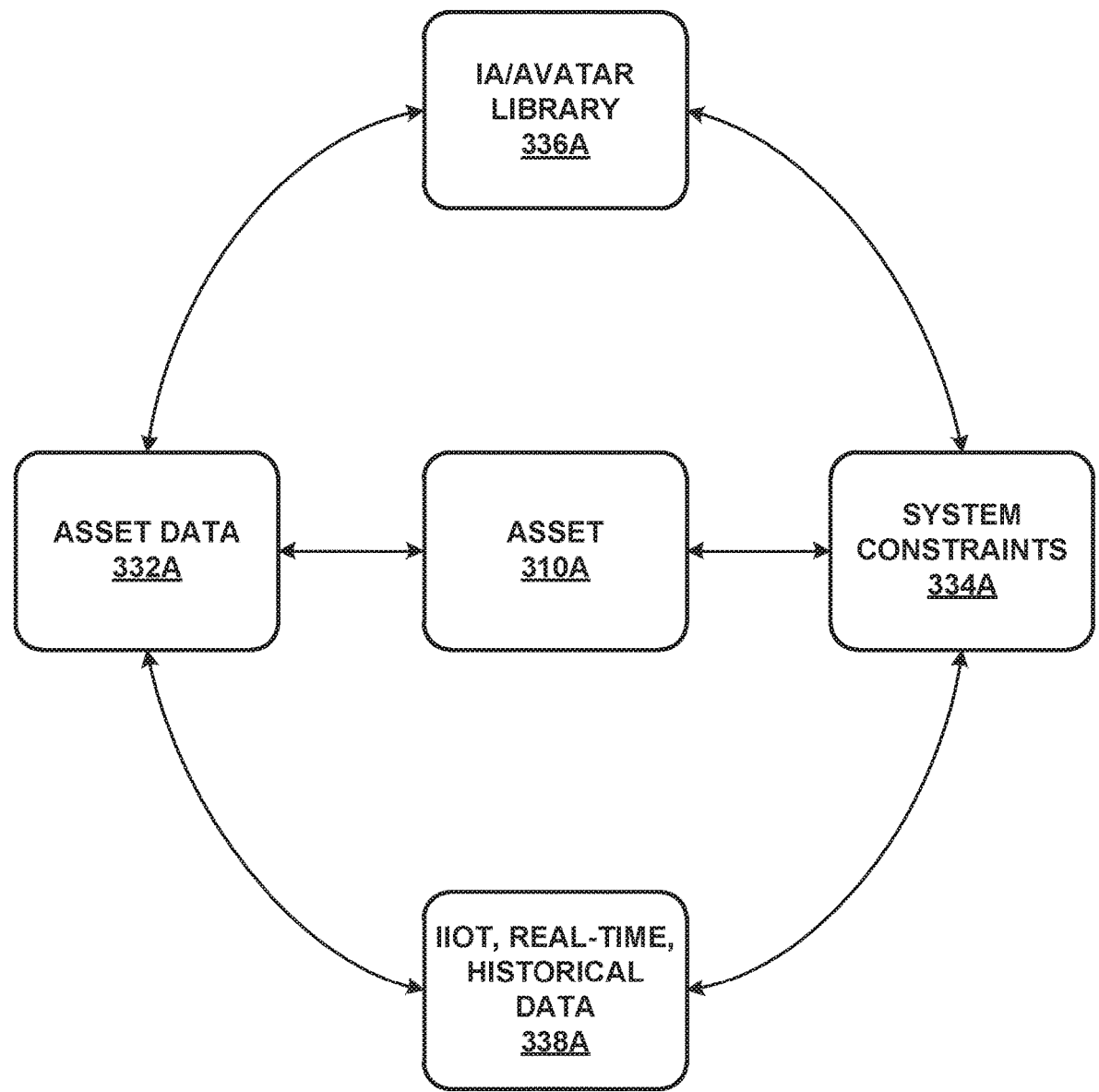

With reference now to FIGS. 3A and 3B, flow diagrams of an exemplary method for enabling asset performance management, in-situ, at a network node are depicted. The method can be implemented in the exemplary process control system 100 shown in FIGS. 1A-1D and/or process control system 300 shown in FIG. 3A, or with any other suitable control system. The method for performing process control shown in FIG. 3A is discussed with reference to process control system 100 shown in FIGS. 1A-1D and process control system 300 shown in FIG. 3A. In addition, while FIG. 3A depicts steps performed in a particular order for purposes of illustration, the methods should not be taken as limiting to any particular order or arrangement. One skilled in the art, together with the description, will appreciate that various steps of the methods can be omitted, rearranged, combined, and/or adapted in various ways.

Referring to FIGS. 3A and 3B, system 300 can include wireless device 318A, which can use a LAN, WAN, or internetwork (including the Internet) to communicate over network 306. System 300 further includes an industrial control environment (e.g., such as industrial control environment 102), network node 304, and/or network 306. The industrial control environment can include, for example, individual and/or groups of self-configuring and/or self-identifying asset indicators 316, asset control modules 314A-314E, assets 310A-310B, and/or units (not shown). As discussed above with reference to FIGS. 1A-1D, the asset indicators 316 and/or asset control modules 314A-314E can be embedded in and networked at assets 310A-310C such that the assets 310A-310C, in conjunction with asset indicators 316 and/or asset control modules 314A-314E, operate as autonomous or semi-autonomous control systems configured to control and/or optimize process control of the industrial control environment, in-situ, at the asset 310A-310C. In one exemplary embodiment, the asset indicators 316 and/or asset control modules 314A-314E can be manually preprogrammed and/or keyed at the assets 310A-310C such that, on embedding and networking at the assets 310A-310C, the asset indicators 316 and/or asset control modules 314A-314E can self-configure. Further, individual and/or groups of asset indicators 316 and/or asset control modules 314A-314E can be configured in master-slave relationships (e.g., parent-child, client-server, publisher-subscriber, etc.) at assets 310A-310C deployed in, for example, hierarchical layers (A)-(E), as shown in FIG. 1B. In addition, individual and/or groups of asset indicators 316, asset control modules 314A-314E, and/or assets 310A-310C configured throughout units of the industrial control environment can be configured in master-slave relationships at the units.

At step 332, a network node (e.g., asset indicators 316, control modules 314A-314E, and/or assets 310A-310C), using, for example, an application and/or CPU or other control module, can receive and/or collect configuration information. For example, asset configuration information (e.g., operational limits, asset performance and/or dynamic characteristics, Failure Mode and Effects Analysis (FMEA) results, consumption and/or emission characteristics, environmental impact analysis results, etc., associated with the network nodes) can be received and/or collected from a datastore such as, for example, asset equipment library module 332A and/or IA/avatar library module 336A, hosted at and/or distributed among network 306, network node 304, and/or wireless device 318A of process control system 300 or a cloud-based or external control module configured to communicate with process control system 300. Alternatively, the datastore (e.g., asset equipment library module 332A, IA/avatar library module 336A, etc.) can be hosted at and/or distributed among the network nodes. Network 306, network node 304, wireless device 318A, and/or the network nodes can collect the asset configuration information from the datastore (e.g., asset equipment library module 332A, IA/avatar library module 336A, etc.) and store the collected asset configuration information at, for example, a risk control module (not shown) accessible by, for example, the network 306, network node 304, wireless device 318A, and/or the network nodes.

At step 334, a network node, using, for example, an application and/or CPU or other control module, can receive and/or collect constraint information. For example, constraint information (e.g., process constraint information such as environmental control data, asset control data, safety constraints, asset characteristics, emissions data, materials of construction, process environment characteristics, materials being processed, process conditions, and/or other process metrics, etc.) can be received and/or collected from a datastore such as, for example, asset equipment library module 332A, system constraints module 334A, IA/avatar library module 336A, and/or Internet of Things (IIoT), real-time, historical data module 338A, hosted at and/or distributed among network 306, network node 304, and/or wireless device 318A of process control system 300 or a cloud-based or external control module configured to communicate with process control system 300. Alternatively, the datastore (e.g., asset equipment library module 332A, system constraints module 334A, IA/avatar library module 336A, IIoT real-time, historical data module 338A, etc.) can be hosted at and/or distributed among the network nodes. Network 306, network node 304, wireless device 318A, and/or the network nodes can collect the constraint information from the datastore and store the collected asset configuration information at, for example, a risk control module (not shown) accessible by, for example, the network 306, network node 304, wireless device 318A, and/or the network nodes.

At step 336, a network node, using, for example, an application and/or CPU or other control module, can control and/or optimize process control of an environment, in-situ, at a network node. For example, network 306, network node 304, and/or wireless device 318A of process control system 300 or a cloud-based or external control module configured to communicate with process control system 300, using the risk control module, can calculate reliability and/or risk metrics for network nodes configured in, for example, hierarchical layers (A)-(E) of the industrial control environment. The reliability and/or risk metrics can be calculated for each network node configured in, for example, hierarchical layers (A)-(E) and at each hierarchical layer (A)-(E); the calculated reliability and/or risk metrics can include and/or consider, for example, the asset configuration information and/or constraint information of the network nodes. Using the calculated reliability and/or risk metrics, network 306, network node 304, and/or wireless device 318A of process control system 300 or a cloud-based or external control module can calculate, at a risk control module, reliability and/or risk constraints for the network nodes. The reliability and/or risk constraints can be calculated for each network node configured in, for example, hierarchical layers (A)-(E) and at each hierarchical layer (A)-(E). In addition, reliability and/or risk constraints can be calculated for the industrial control environment and/or process control system 300. The calculated reliability and/or risk constraints can be sent to an optimizer hosted at and/or distributed among network 306, network node 304, and/or wireless device 318A of process control system 300 or a cloud-based or external control module configured to communicate with process control system 300. Alternatively, the calculated reliability and/or risk constraints can be sent to an optimizer hosted at and/or distributed among the network nodes, which form part of a communication fog that clings to the industrial control environment of process control system 300. The optimizer, using optimizer logic, can be configured to optimize for profit, maximizing production, minimizing inventory, maximizing quality, safety constraints, environmental constraints, integrated absolute controller error, etc. Using the optimization, network 306, network node 304, and/or wireless device 318A of process control system 300 or a cloud-based or external control module configured to communicate with process control system 300 can implement a control strategy (e.g., a collection of loops configured to perform a particular function at the network nodes) or algorithm (e.g., a function block) that transforms, in real-time, aspects (e.g., state commands, phase commands, process control logic, procedures, etc.) of the network nodes and/or units such that process control of, for example, industrial control environment is optimized, in-situ, at the network nodes. Alternatively, the network nodes can use the optimization to control and/or optimize process control of, for example, the industrial control environment, in-situ, at the network nodes.

In one exemplary embodiment, IAs or avatars can be hosted at and/or distributed among, for example, an application and/or CPU or other control module of network 306, network node 304, and/or wireless device 318A of process control system 300 or at a cloud-based or external control module configured to communicate with process control system 300. Alternatively, the IAs or avatars can be hosted at and/or distributed among, for example, applications and/or CPUs or other control modules of the network nodes; the IAs or avatars of the network nodes form part of the communication fog that clings to the industrial control environment of process control system 300. The IAs or avatars can calculate (e.g., using a risk control module) reliability and/or risk metrics and/or reliability and/or risk constraints for each network node configured in, for example, hierarchical layers (A)-(E) and at each hierarchical layer (A)-(E); the calculated reliability and/or risk metrics can include and/or consider, for example, the asset configuration information and/or constraint information of the network nodes. The calculated reliability and/or risk constraints can be sent to an optimizer hosted at and/or distributed among network 306, network node 304, and/or wireless device 318A of process control system 300 or a cloud-based or external control module configured to communicate with process control system 300. Alternatively, the calculated reliability and/or risk constraints can be sent to an optimizer hosted at and/or distributed among IAs or avatars of the network nodes. The optimizer, using optimizer logic, can be configured to optimize for profit, maximizing production, minimizing inventory, maximizing quality, safety constraints, environmental constraints, integrated absolute controller error, etc. Using the optimization, the IAs or avatars can implement a control strategy or algorithm that transforms, in real-time, aspects of the network nodes and/or units such that process control of, for example, industrial control environment is optimized, in-situ, at the network nodes.

Figure 4A:
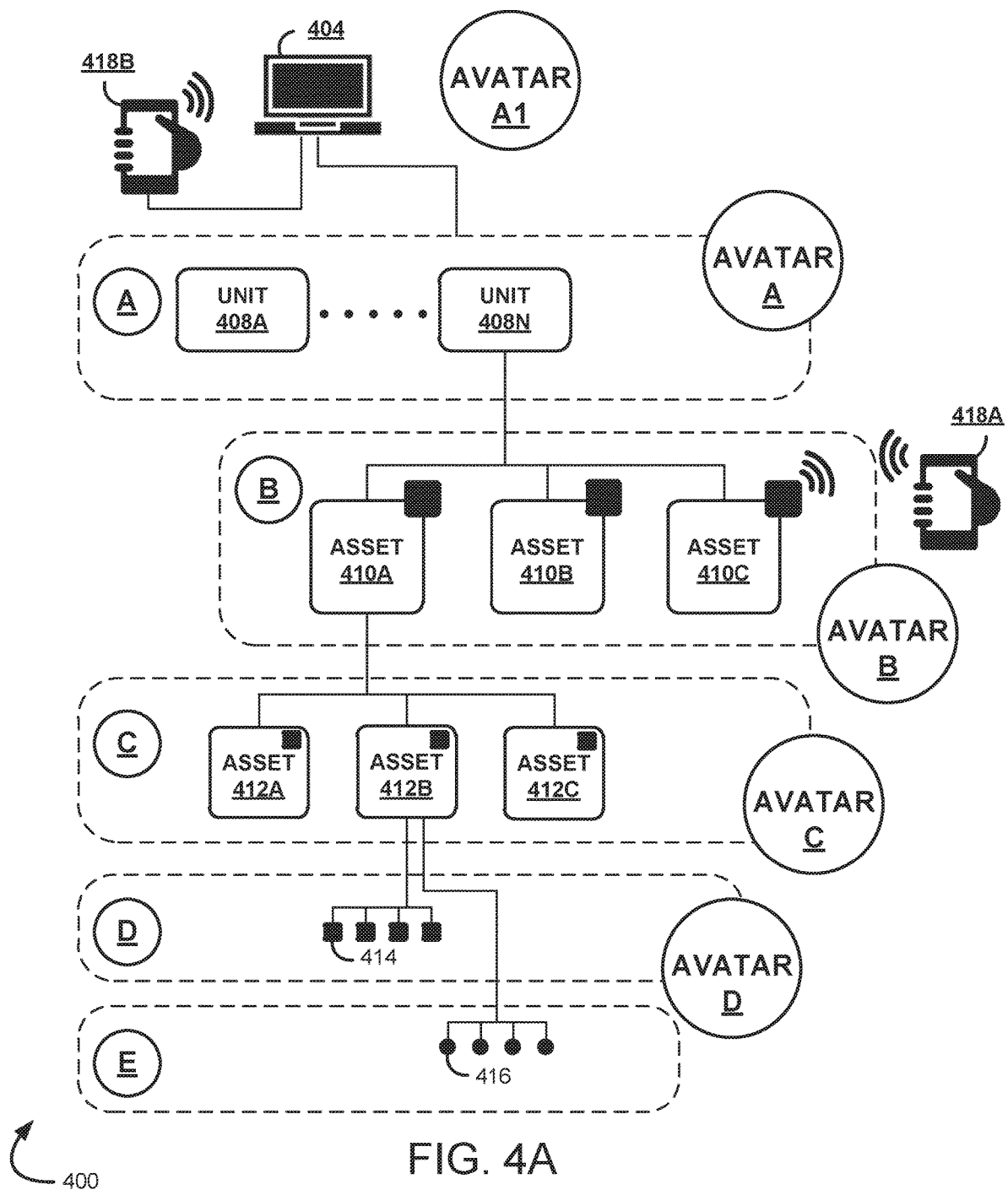
FIGS. 4A and 4B are schematic diagrams that show a portion of the exemplary process control system configured with "intelligent agents (IAs)" or "avatars" in accordance with an exemplary embodiment of the present disclosure.
Figure 4B:
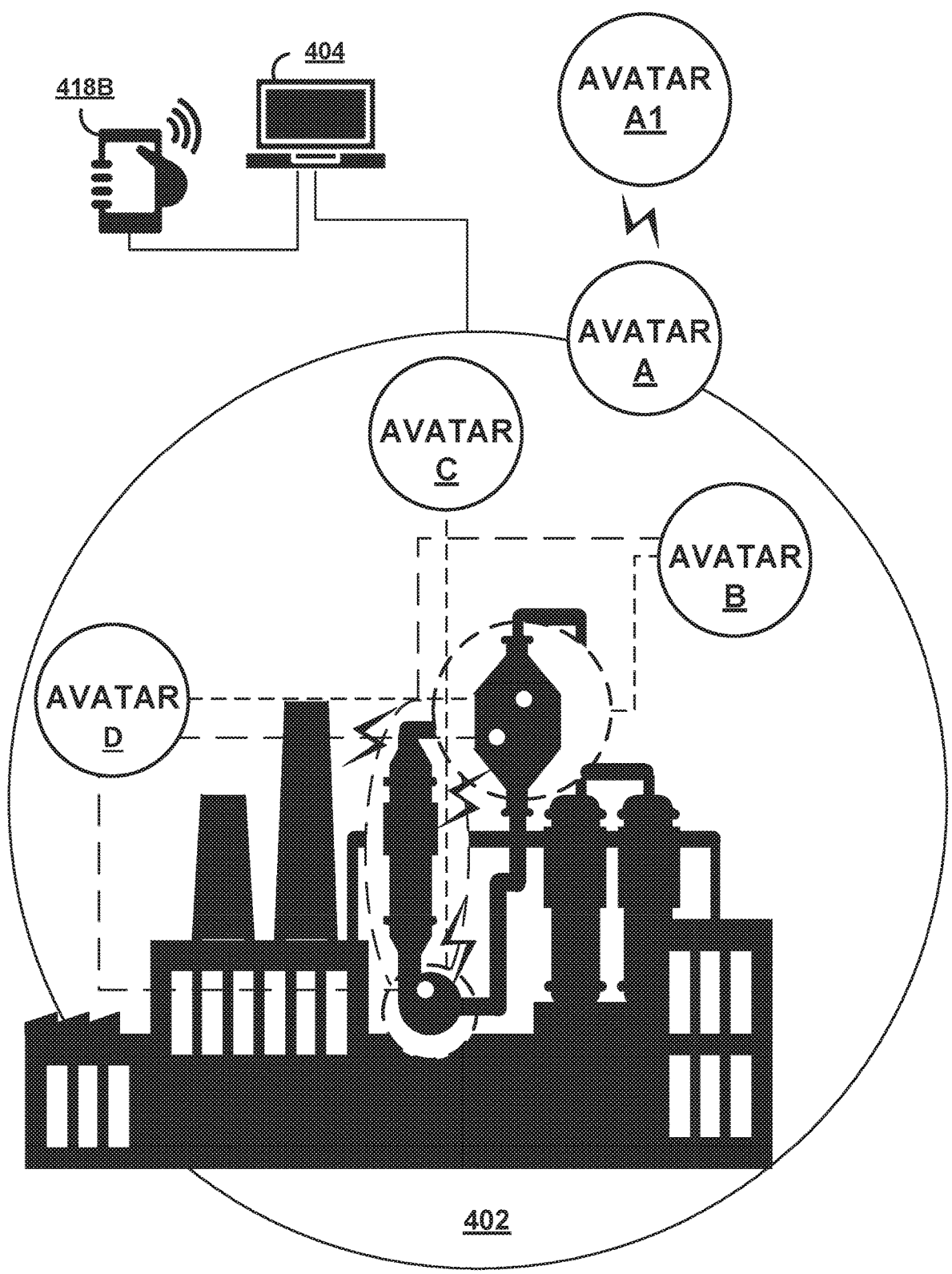

With reference now to FIGS. 4A and 4B, schematic views of an exemplary process control system 400 is depicted. System 400 can include wireless devices 418A, 418B, which can use a LAN, WAN, or internetwork (including the Internet) to communicate over the network (not shown). System 400 can further include an industrial control environment 402 and/or network node 404. As shown in FIG. 4A, the industrial control environment 402 includes (or can be broken down into) individual and/or groups of self-configuring and/or self-identifying units 408A-408N. The self-configuring and/or self-identifying units 408A-408N can include individual and/or groups of self-configuring and/or self-identifying asset indicators 416, asset control modules 414, and/or assets 410A-410C, 412A-412C configured in, for example, hierarchical layers (A)-(E) at units 408A-408N based on, for example, a criterion (e.g., physical hierarchical relationship, physical location, profile, classification, type, role, etc.) of the asset indicators 416, asset control modules 414, and/or assets 410A-410C, 412A-412C. Asset indicators 416 and/or asset control modules 414 can be configured at lower hierarchical layers (D), (E) compared to assets 410A-410C, 412A-412C and/or units 408A-408N. Further, asset indicators 416 and/or asset control modules 414 can be embedded in and networked at assets 410A-410C, 412A-412C such that the assets 410A-410C, 412A-412C, in conjunction with the asset indicators 416 and/or asset control modules 414, operate as autonomous or semi-autonomous control systems. In one exemplary embodiment, the asset indicators 416 and/or asset control modules 414 can be manually preprogrammed and/or keyed at the assets 410A-410C, 412A-412C such that, on embedding and networking at the assets 410A-410C, 412A-412C, the asset indicators 416 and/or asset control modules 414 can self-configure.

In one exemplary embodiment, IAs or avatars (A1) can be hosted at and/or distributed among, for example, an application and/or CPU or other control module of the network, network node 404, and/or wireless device 418A, 418B of process control system 400 or at a cloud-based or external control module configured to communicate with process control system 400. Alternatively, the IAs or avatars (A)-(D) can be hosted at and/or distributed among, for example, applications and/or CPUs or other control modules of asset indicators 416, asset control modules 414, assets 410A-410C, 412A-412C, and/or units 408A-408N; the IAs or avatars (A)-(D) hosted at and/or distributed among the asset indicators 416, asset control modules 414, assets 410A-410C, 412A-412C, and/or units 408A-408N form part of the communication fog that clings to the industrial control environment 402 of process control system 400. For example, as shown in FIG. 4B, the IAs or avatars (A)-(D) can be hosted at and/or configured for each asset indicator 416, asset control module 414, and/or asset 410A-410C, 412A-412C configured at units 408A-408N in, for example, hierarchical layers (A)-(E) and at each hierarchical layer (A)-(E). In addition, IAs or avatars (A), (A1) can be hosted at and/or configured for units 408A-408N of the industrial control environment 402 and/or for the environmental process control system 400. The IAs or avatars (A1)-(D) can send and/or receive control signals (e.g., any wired and/or wireless signal capable of being received, recognized, and/or processed by network nodes and/or IAs or avatars to which the control signal is directed) to/from each other (A1)-(D).

With reference now to FIGS. 4A-4F, asset indicators 416, asset control modules 414, 414A-414E, and/or assets 410A-410C, 412A-412C can send/or receive control signals to/from other asset indicators 416, asset control modules 414, 414A-414E, and/or assets 410A-410C, 412A-412C configured in, for example, master-slave relationships (e.g., parent-child, client-server, publisher-subscriber, etc.) at units 408A-408N using IAs or avatars (A1)-(D). Each of the asset indicators 416, asset control modules 414, 414A-414E, assets 410A-410C, 412A-412C, and/or units 408A-408N can be provided with software instructions (e.g., at a software module and/or other control module that includes a processor) that enable IAs or avatars (A1)-(D) to operate at and/or among the asset indicators 416, asset control modules 414, 414A-414E, assets 410A-410C, 412A-412C, and/or units 408A-408N; thus, the IAs or avatars (A1)-(D) can select a quickest and/or most efficient path to route control signals across the communication fog to other asset indicators 416, asset control modules 414, 414A-414E, assets 410A-410C, 412A-412C, units 408A-408N, and/or to other IAs or avatars (A1)-(D). Further, the IAs or avatars (A)-(D) hosted at and/or distributed among, for example, the asset indicators 416, asset control modules 414, 414A-414E, assets 410A-410C, 412A-412C, and/or units 408A-408N can use the communication fog to detect and/or configure newly added, redundant, and/or idle or off state asset indicators 416, asset control modules 414, 414A-414E, assets 410A-410C, 412A-412C, and/or units 408A-408N "waking up." In other words, IAs or avatars (A)-(D) can self-deploy and/or self-adapt to the newly added, redundant, and/or active asset indicators 416, asset control modules 414, 414A-414E, assets 410A-410C, 412A-412C, and/or units 408A-408N using the communication fog and, on deployment and/or adaption, can control the asset indicators 416, asset control modules 414, 414A-414E, assets 410A-410C, 412A-412C, and/or units 408A-408N.

Figure 4C:
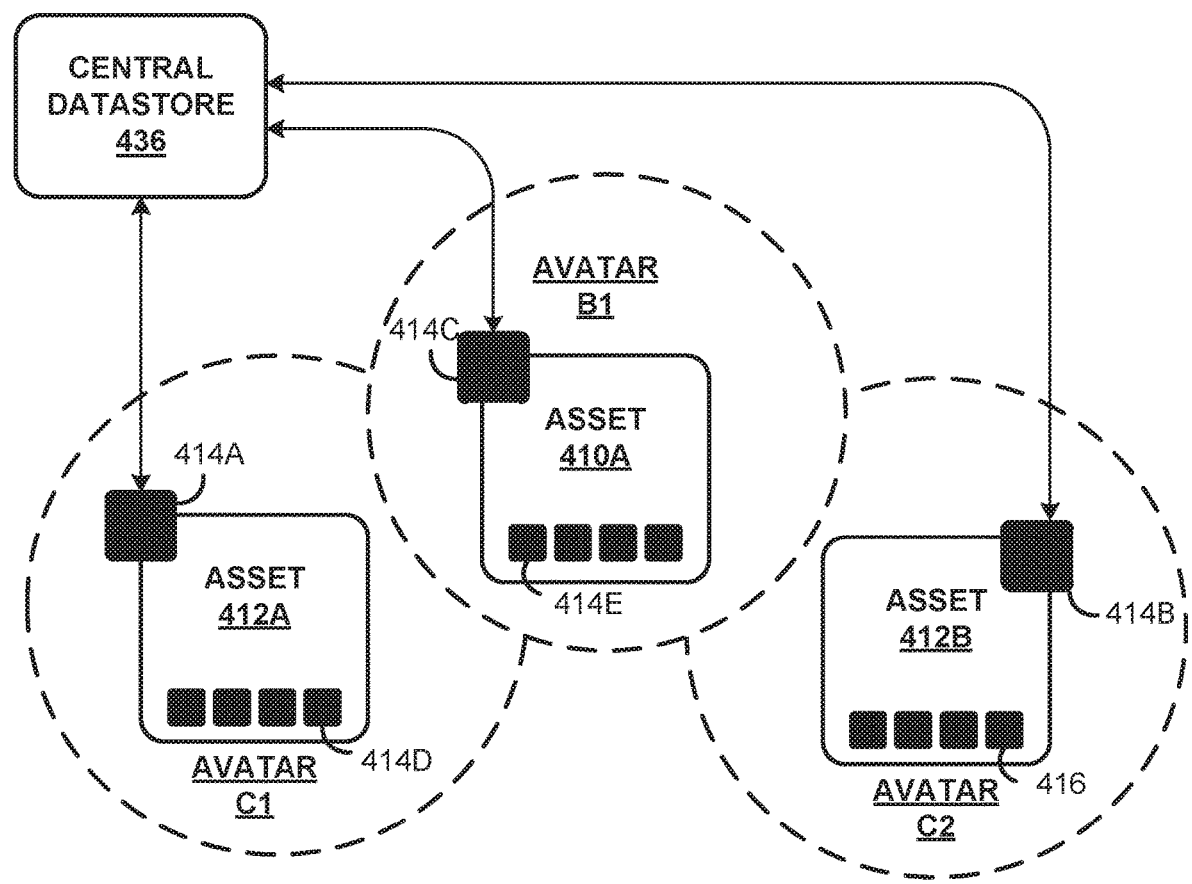
FIGS. 4C-4E are schematic diagrams that show a portion of the exemplary process control system of FIGS. 4A and 4B configured with IAs or avatars in accordance with an exemplary embodiment of the present disclosure.

Referring to FIGS. 4A and 4C, in one exemplary embodiment, a central datastore 436 (e.g., a redundant, distributed, and/or federated datastore configured at an application and/or CPU or other control module) can be hosted at and/or distributed among, for example, the network, network node 404, and/or wireless device 418A, 418B of process control system 400 or at a cloud-based or external control module. accessible by asset indicators 416, asset control modules 414, 414A-414E, assets 410A-410C, 412A-412C, units 408A-408N, and/or IAs or avatars (A1)-(D). Alternatively, the central datastore 436 can be hosted at and/or distributed among, for example, asset indicator 416, asset control modules 414, 414A-414E, assets 410A-410C, 412A-412C, and/or units 408A-408N accessible by asset indicators 416, asset control modules 414, 414A-414E, assets 410A-410C, 412A-412C, units 408A-408N, and/or IAs or avatars (A1)-(D). Asset indicators 416, asset control modules 414, 414A-414E, assets 410A-410C, 412A-412C, and/or units 408A-408N can exchange and/or store control information, configuration information, and/or constraint information at the central datastore 436 at set time intervals (e.g., milliseconds, seconds, minutes, hours, days, years, etc.) and/or when triggered (e.g., event-based, user-initiated, operator-initiated, etc.). The asset indicators 416, asset control modules 414, 414A-414E, assets 410A-410C, 412A-412C, and/or units 408A-408N can exchange and/or store the information at the central datastore 436 directly, using the communication fog, and/or using IAs or avatars (A1) (D). Further, asset indicators 416, asset control modules 414, 414A-414E, assets 410A-410C, 412A-412C, and/or units 408A-408N can receive and/or retrieve control information, configuration information, and/or constraint information stored at the central datastore 436 directly, using the communication fog, and/or using IAs or avatars (A1)-(D).

For example, referring to FIG. 4C, asset indicators 416, asset control modules 414A-414E, and/or assets 410A, 412A, 412B that form part of the communication fog and/or IAs or avatars (B1), (C1), (C2) hosted at and/or distributed among asset indicators 416, asset control modules 414A-414E, and/or assets 410A, 412A, 412B can exchange and/or store updated control information, configuration information, and/or constraint information at the central datastore 436 using the communication fog and/or IAs or avatars (B1), (C1), (C2). Further, asset indicators 416, asset control modules 414A-414E, and/or assets 410A, 412A, 412B that form part of the communication fog and/or IAs or avatars (B1), (C1), (C2) can directly receive and/or retrieve control information, configuration information, and/or constraint information stored at the central datastore 436.

In one exemplary embodiment, the central datastore 436, the communication fog, and/or IAs or avatars (B1), (C1), (C2) hosted at and/or distributed among, for example, asset indicators 416, asset control modules 414A-414E, and/or assets 410A, 412A, 412B can detect a failure of, for example, asset control module 414A. On detection of the failure of asset control module 414A, the central datastore 436, the communication fog, and/or IAs or avatars (B1), (C1), (C2) can send a control signal to asset 412A instructing the asset 412A to detect and/or configure a newly added, redundant, and/or idle or off state asset control module 414D "waking up." Once the asset control module 414D enters an "active" state, the central datastore 436, communication fog, and/or IAs or avatars (B1), (C1), (C2) can self-deploy and/or self-adapt to asset control module 414D. Using the central datastore 436, communication fog, and/or IAs or avatars (B1), (C1), (C2), the asset control module 414D can retrieve control information, configuration information, and/or constraint information exchanged and/or stored at the central datastore 436 by, for example, the failed asset control module 414A from the central datastore 436.

In another exemplary embodiment, the central datastore 436 can collect and/or store exchanged and/or updated control information, configuration information, and/or constraint information reported by, for example, asset indicators 416, asset control modules 414A-414E, assets 410A, 412A, 412B, and/or IAs or avatars (B1), (C1), (C2). Using the exchanged and/or updated control information, configuration information, and/or constraint information, the central datastore 436 can calculate reliability and/or risk metrics and/or constraints for asset indicators 416, asset control modules 414A-414E, and/or assets 410A, 412A, 412B of units 408A-408N. The reliability and/or risk constraints can be calculated for each asset indicator 416, asset control module 414A-414E, and/or asset 410A, 412A, 412B configured in, for example, hierarchical layers (A)-(E) and at each hierarchical layer (A)-(E). Asset indicators 416, asset control modules 414A-414E, assets 410A, 412A, 412B, and/or IAs or avatars (B1), (C1), (C2) can retrieve the calculated reliability and/or risk constraints from the central datastore 436, directly and/or using the communication fog, and, using an optimizer hosted at and/or distributed among the asset indicator 416, asset control modules 414A-414E, assets 410A, 412A, 412B, and/or IAs or avatars (B1), (C1), (C2) can implement a control strategy or algorithm that transforms, in real-time, aspects of the asset indicators 416, asset control modules 414A-414E, assets 410A, 412A, 412B, and/or IAs or avatars (B1), (C1), (C2) such that process control of, for example, industrial control environment 402 is optimized, in-situ, at the asset indicator 416, asset control module 414A-414E, and/or asset 410A, 412A, 412B.

Figure 4D:
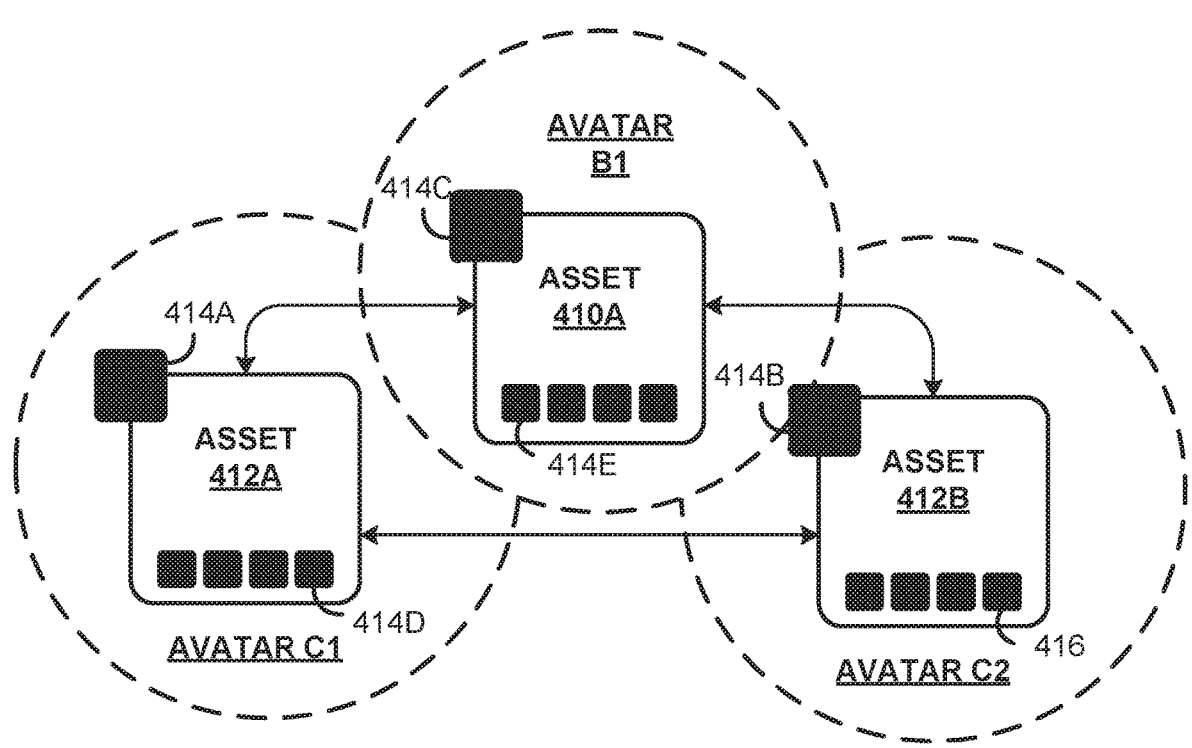

Referring to FIGS. 4A and 4D, asset indicators 416, asset control modules 414, 414A 414E, assets 410A 410C, 412A 4120, and/or units 408A-408N can be configured in a peer-to-peer relationship (e.g., publisher-subscriber, client-server, etc.). For example, referring to FIG. 4D, peer-to-peer asset indicators 416, asset control modules 414A-414E, assets 410A, 412A, 412B, and/or units 408A-408N can exchange control information, configuration information, and/or constraint information with each other and/or store the information at, for example, an application and/or CPU or other control module hosted at and/or distributed among other peer-to-peer asset indicators 416, asset control modules 414A-414E, assets 410A, 412A, 412B, and/or units 408A-408N at set time intervals and/or when triggered using the communication fog and/or IAs or avatars (B1), (C1), (C2).

Figure 4E:
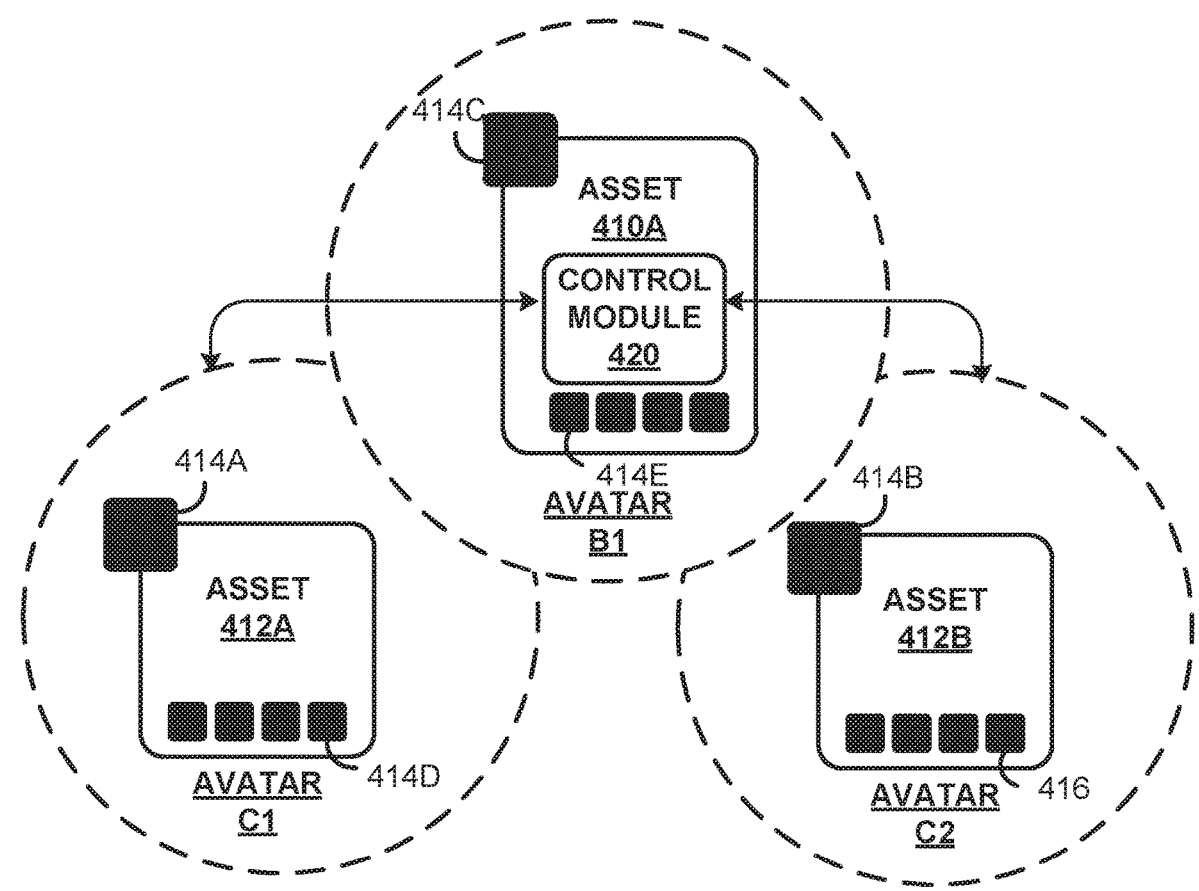

Referring to FIGS. 4A and 4E, master-slave asset indicators 416, master-slave asset control modules 414A, 414B, 414D, 414E, and/or master-slave assets 412A, 412B can exchange control information, configuration information, and/or constraint information at, for example, a control module and/or router 420 of master asset control module 414C and/or master asset 410A configured in, for example, a same or higher hierarchical layer (A)-(E) at set time intervals and/or when triggered using the communication fog and/or IAs or avatars (B1), (C1), (C2).

In one exemplary embodiment, the control module and/or router 420 of the master asset control module 414C and/or master asset 410A, on receipt of the information, can decipher, manipulate, and/or combine the exchanged control information, configuration information, and/or constraint information. Subsequently, the control module and/or router 420 of the master asset control module 414C and/or master asset 410A can send the deciphered, manipulated, and/or combined control information, configuration information, and/or constraint information to other master-slave asset indicators 416, master-slave asset control modules 414A, 414B, 414D, 414E, and/or master-slave assets 412A, 412B using, for example, the communication fog and/or IAs or avatars (B1), (C1), (C2).

In another exemplary embodiment, the control module and/or router 420 of the master asset control module 414C and/or master asset 410A, on receipt of the information, can relay the unchanged control information, configuration information, and/or constraint information to other master-slave asset indicators 416, master-slave asset control modules 414A, 414B, 414D, 414E, and/or master-slave assets 412A, 412B using, for example, the communication fog and/or IAs or avatars (B1), (C1), (C2).

In yet another exemplary embodiment, the master-slave asset indicators 416, master-slave asset control modules 414A, 414B, 414D, 414E, and/or master-slave assets 412A, 412B can act as repeaters that relay unchanged control information, configuration information, and/or constraint information to the control module and/or router 420 of the master asset control module 414C and/or master asset 410A and/or to other master-slave asset indicators 416, master-slave asset control modules 414A, 414B, 414D, 414E, and/or master-slave assets 412A, 412B using the communication fog and/or IAs or avatars (B1), (C1), (C2).

Figure 5:
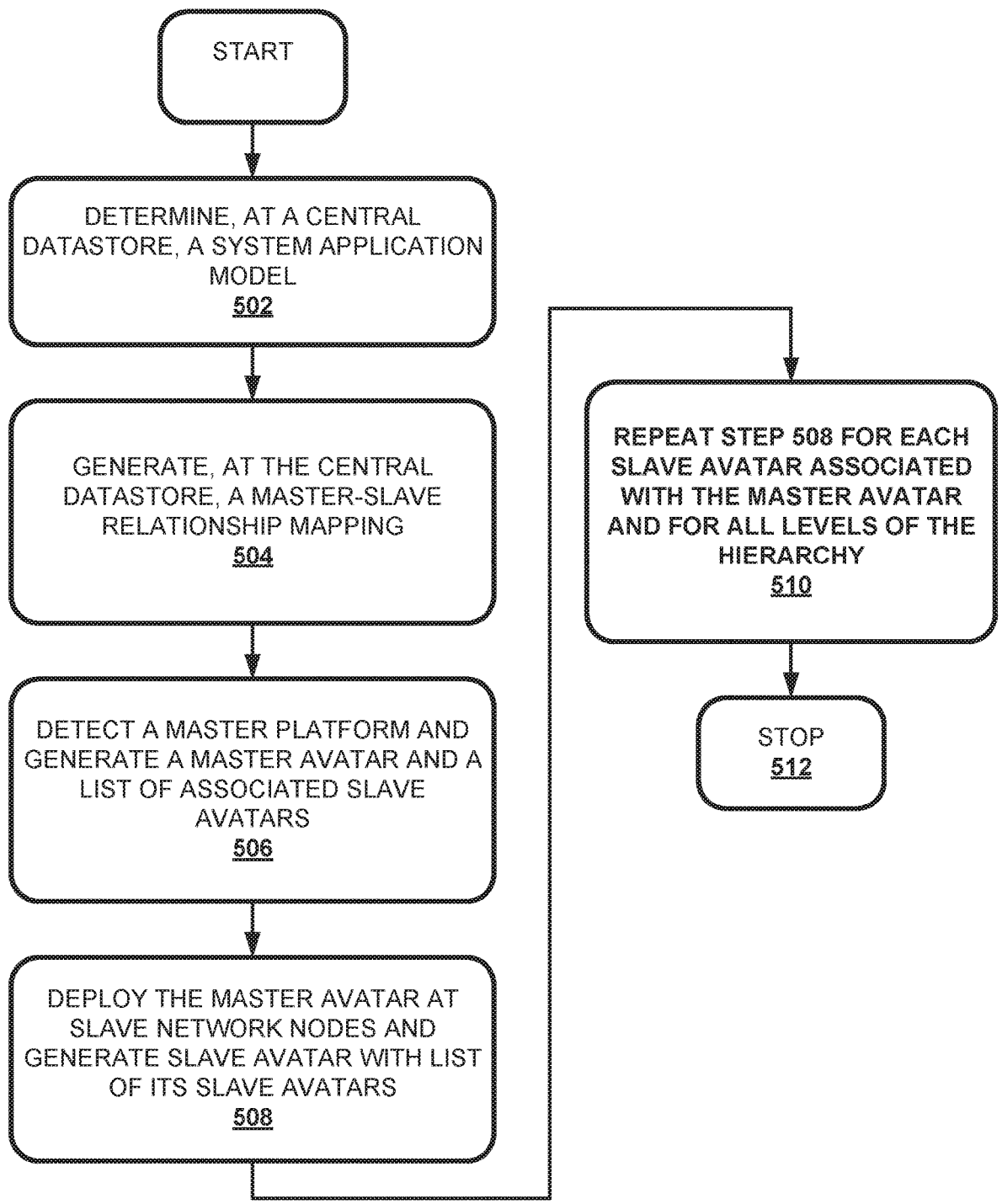
FIG. 5 is a flow diagram depicting a method for asset performance management, in-situ, at a network node in accordance with an exemplary embodiment of the present disclosure.

With reference now to FIG. 5, a flow diagram of an exemplary method for asset performance management, in-situ, at a network node is depicted. The method can be implemented in the exemplary process control system 100 shown in FIGS. 1A-1D, in the exemplary process control system 300 shown in FIGS. 3A-3B, in the exemplary process control system 400 shown in FIGS. 4A-4F, or with any suitable control system. The method for asset performance management shown in FIG. 5 is discussed with reference to process control system 400 shown in FIGS. 4A-4F. In addition, while FIG. 5 depicts steps performed in a particular order for purposes of illustration, the methods should not be taken as limiting to any particular order or arrangement. One skilled in the art, together with the description, will appreciate that various steps of the methods can be omitted, rearranged, combined, and/or adapted in various ways.

At step 502, a process control system application model can be generated at a central datastore. For example, in one exemplary embodiment, a user, using, for example, an application hosted at network node 404 and/or wireless device 418B, can generate a process control system application model using control information, configuration information, and/or constraint information collected from master-slave asset indicators 416, master-slave asset control modules 414, master-slave assets 410A-410C 412A-412C, units 408A-408N, systems constraints module 334A, asset equipment library module 332A, IA/avatar library module 336A, IIoT real-time, and/or historical data module 338A. The generated process control system application model can be stored at a central datastore accessible by, for example, master-slave asset indicators 416, master-slave asset control modules 414, master-slave assets 410A-410C 412A-412C, units 408A-408N, and/or IAs or avatars (A1)-(D).

At step 504, using a generated application model, a network node can create a master-slave relationship mapping. For example, the network node 404 and/or wireless device 418B can use the process control system application model generated at step 502 to create a master-slave relationship mapping that identifies nearest neighbors, master-slave relationships (e.g., parent-child, client-server, publisher-subscriber, etc.), and/or hierarchical layer criterion (e.g., physical hierarchical relationship, physical location, profile, classification, type, role, etc.) for master-slave asset indicators 416, master-slave asset control modules 414, master-slave assets 410A-410C, 412A-412C, units 408A-408N, and/or IAs or avatars (A1)-(D) configured in, for example, hierarchical layers (A)-(E).

At step 506, a network node can deploy the master-slave relationship mapping at a network node. For example, the network node 404 and/or wireless device 418B, using a wired and/or wireless connection or using a short-range, low-power communication protocol, can deploy the master-slave relationship mapping at, for example, a master asset control module 414C. On deployment, the master asset control module 414C can decrypt, decipher, access, and/or process the master-slave relationship mapping. Using the decrypted, deciphered, accessed, and/or processed master-slave relationship mapping, the master asset control module 414C can execute and/or generate a master IA or avatar and page (e.g., as discussed in FIG. 1D) a list of master-slave asset indicators 416, master-slave asset control modules 414, master-slave assets 410A-410C, 412A-412C, units 408A-408N, and/or master-slave IAs or avatars (A1)-(D) operating in a master-slave relationship with the master paging asset control module 414C.

At step 508, a network node can deploy master IAs or avatars and/or detect slave IAs or avatars. For example, master asset control module 414C can deploy select portions of the master-slave relationship mapping to other master-slave asset indicators 416, master-slave asset control modules 414, master-slave assets 410A-410C, 412A-412C, and/or units 408A-408N configured in hierarchical layers (A)-(E). On deployment, the master-slave asset indicators 416, master-slave asset control modules 414, master-slave assets 410A-410C, 412A-412C, and/or units 408A-408N can decrypt, decipher, access, and/or process the deployed portions of the master-slave relationship mapping. Using the deployed portions, the master-slave asset indicators 416, master-slave asset control modules 414, master-slave assets 410A-410C, 412A-412C, and/or units 408A-408N can execute and/or generate master-slave IAs or avatars and page another list of master-slave asset indicators 416, master-slave asset control modules 414, master-slave assets 410A-410C, 412A-412C, units 408A-408N, and/or master-slave IAs or avatars operating in a master-slave relationship with the other master-slave asset indicators 416, master-slave asset control modules 414, master-slave assets 410A-410C, 412A-412C, units 408A-408N, and/or IAs or avatars.

At step 510, step 508 can be repeated for each of the master-slave asset indicators 416, master-slave asset control modules 414, master-slave assets 410A-410C, 412A-412C, and/or units 408A-408N of the industrial control system 400. At step 512, the process stops.

Other embodiments of the invention will be apparent to those skilled in the art from consideration of the specification and practice of the present disclosure and claims herein. It is intended that the specification and examples be considered as exemplary only, with a scope being indicated by the claims, including equivalents.

What is claimed is:

1. A system for performing control, in-situ, at an asset, the system comprising:
   an asset; and
   at least a first network node embedded and networked, in-situ, at the asset, the first network node configured to:
   decrypt an encoded relationship mapping, wherein the encoded relationship mapping is deployed at the first network node by a user through a user device configured to communicate with the first network node using a short-range, low-power communication protocol, the relationship mapping identifying at least one or more master-slave relationships;
   page at least a second network node using the decrypted relationship mapping; and
   deploy a select portion of the decrypted relationship mapping to the second network node on receipt of a signal from the second network node,
   wherein the relationship mapping or a portion thereof is deployed at the first and second network nodes to establish or optimize process control at the first network node and the second network node,
   wherein an avatar is distributed at the asset, the avatar being configured to:
   collect control information, asset configuration information, and/or constraint information from a central datastore;
   calculate risk metrics and/or risk constraints for the asset, the first network node, and the second network node using the collected control information, asset configuration information, and/or constraint information; and
   optimize control of the system, in-situ, at the asset using the calculated risk metrics and risk constraints.

2. The system of claim 1, further comprising:
   distributing an avatar among the first and second network nodes; and
   optimizing control, in-situ, at the asset using the distributed avatar.

3. The system of claim 2, wherein the avatar is distributed among control modules of the first and second network nodes.

4. The system of claim 1, further comprising: collecting, from a central datastore, control information;
   executing control logic using control information at avatars distributed among the first and second network nodes: and
   optimizing control, in-situ, at the asset using the executed control information.

5. The system of claim 1, wherein the relationship mapping further identifies nearest neighbors, and/or hierarchical layer criterion for the asset, the first network node, and/or the second network node.

6. The system of claim 1, wherein the short-range, low-power communication protocol is a near-field communication (NEC) protocol.

7. A method for performing control of a system, in-situ, at an asset, the method comprising:
   receiving information from a user device to initiate deployment of an application model at a first network node fixed, in-situ, at the asset across a short-range, low-power communication network to configure a plurality of network nodes including the first network node;
   deploying the system application model to at least the first network node, the system application model identifying at least one or more master-slave relationships;
   executing, at the first network node, a master avatar using the deployed system application model; and
   generating, at a second network node, a master-slave avatar using the master avatar executed at the first network node,
   wherein the master avatar and/or master-slave avatar is configured to perform process control of the system, in-situ, at the first network node and the second network node,
   wherein the master avatar and/or master-slave avatar is further configured to:
   collect control information, asset configuration information, and/or constraint information from a central datastore;
   calculate risk metrics and/or risk constraints for the asset, the first network node, and the second network node using the collected control information, asset configuration information, and/or constraint information; and
   optimize control of the system, in-situ, at the asset using the calculated risk metrics and risk constraints.

8. The method of claim 7, wherein the system application model is generated using control information, application configuration information, and/or constraint information.

9. The method of claim 7, wherein the short-range, low-power communication network is a communication fog formed by at least the first network node and the second network node.

10. The method of claim 7, wherein the system application model is further deployed using a short-range, low-power communication protocol.

11. The method of claim 7, further comprising:
    optimizing, using the master avatar and/or master-slave avatar, aspects of the asset, the first network node, and/or the second network node,
    wherein the aspects are one or more of: state commands, phase commands, control logic, and/or procedures associated with the asset, the first network node, and/or the second network node.

12. A system for asset performance management, in-situ, at an asset, the system comprising:
    an asset; and a plurality of asset control modules logically coupled to the asset, at least one of the plurality of asset control modules being configured to:
  receiving information from a user device to initiate deployment of an application model at the at least one of the plurality of asset control modules across a short-range, low-power communication network to configure the plurality of asset control modules;
  access an application model stored at a central datastore, the application model including a relationship mapping for the plurality of asset control modules, the relationship mapping identifying at least one or more master-slave relationships;
  configure, using the relationship mapping, a communication fog that includes the plurality of asset control modules; and
  execute a control strategy at the asset using the configured communication fog to establish or optimize process control at the plurality of asset control modules,
  wherein the executed control strategy is configured to:
    optimize control of the system, in-situ, at the asset using calculated risk metrics and/or risk constraints, the risk metrics and/or risk constraints being calculated using control information, asset configuration information, and/or constraint information collected from the central datastore,
    wherein control is optimized, in-situ, at the asset using an avatar.

13. The system of claim 12, wherein the asset control modules are embedded and networked, in-situ, at the asset, wherein the asset control modules use harvested power to operate.

14. The system of claim 12, wherein the central datastore is distributed among the asset and/or the plurality of asset control modules logically coupled to the asset.

15. The system of claim 12, wherein the relationship mapping further identifies nearest neighbors and/or hierarchical layer criterion for the asset and/or the plurality of asset control modules logically coupled to the asset.

16. The system of claim 12, wherein the plurality of asset control modules logically coupled to the asset are configured as repeaters that relay unchanged control information, configuration information, and/or constraint information to at least a second plurality of asset control modules logically coupled to at least a second asset using the communication fog.

* * * * *